United States Patent
Muntz et al.

(10) Patent No.: US 9,235,479 B1
(45) Date of Patent: *Jan. 12, 2016

(54) DISTRIBUTED FILE SYSTEM HAVING SEPARATE DATA AND METADATA AND PROVIDING A CONSISTENT SNAPSHOT THEREOF

(71) Applicant: EMC Corporation, Hopkinton, MA (US)

(72) Inventors: Daniel A. Muntz, Cupertino, CA (US); Alex Burlyga, Fremont, CA (US); David Noveck, Lexington, MA (US); Sairam Veeraswamy, South Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/338,775

(22) Filed: Jul. 23, 2014

Related U.S. Application Data

(63) Continuation of application No. 13/339,857, filed on Dec. 29, 2011, now Pat. No. 8,818,951.

(51) Int. Cl.
  *G06F 17/30* (2006.01)
  *G06F 11/14* (2006.01)
(52) U.S. Cl.
  CPC ...... *G06F 11/1458* (2013.01); *G06F 17/30088* (2013.01); *G06F 2201/84* (2013.01)
(58) Field of Classification Search
  None
  See application file for complete search history.

(56) References Cited

U.S. PATENT DOCUMENTS

| | | | |
|---|---|---|---|
| 6,934,822 B2 | 8/2005 | Armangau et al. | |
| 7,035,881 B2 | 4/2006 | Tummala et al. | |
| 7,346,623 B2 * | 3/2008 | Prahlad et al. | |
| 7,900,142 B2 * | 3/2011 | Baer | 715/255 |
| 8,032,498 B1 | 10/2011 | Armangau et al. | |
| 2004/0254936 A1 * | 12/2004 | Mohamed | 707/10 |
| 2007/0203938 A1 * | 8/2007 | Prahlad et al. | 707/102 |

OTHER PUBLICATIONS

Shepler, et al., "Internet Engineering Task Force (IETF)", Request for Comments: 5661, Standards Track, Jan. 2010, ISSN: 2070-1721.
IETF RFC 5661, Shepler, et al., Standards Track, Jan. 2010, ISSN: 2070-1721.

* cited by examiner

*Primary Examiner* — Hung Q Pham
(74) *Attorney, Agent, or Firm* — Muirhead and Saturnelli, LLC

(57) ABSTRACT

Described are techniques for creating a snapshot of a distributed file system or a file thereof. The distributed file system includes metadata file systems storing metadata about files in the distributed file system and includes data file systems storing file content data. Quiescing is performed for requests affecting the distributed file system, or a file thereof, for which a snapshot is being created. A snapshot of metadata is obtained. For the distributed file system, this includes a snapshot of each metadata file system. For a file, this includes a snapshot of the file's metadata. A snapshot of file data is obtained. For distributed file systems, this includes a snapshot of each data file system. For a file, this includes a snapshot of the file's data. Unquiescing is performed for requests affecting the distributed file system, or the file thereof, upon successful completion of obtaining snapshots of metadata and file data.

15 Claims, 19 Drawing Sheets

DISTRIBUTED FILE SYSTEM HAVING SEPARATE DATA AND METADATA AND PROVIDING A CONSISTENT SNAPSHOT THEREOF

RELATED APPLICATIONS

This application is a continuation of U.S. patent application Ser. No. 13/339,857, filed Dec. 29, 2011, DISTRIBUTED FILE SYSTEM HAVING SEPARATE DATA AND METADATA AND PROVIDING A CONSISTENT SNAPSHOT THEREOF, which is incorporated by reference herein.

BACKGROUND

1. Technical Field

This application relates to file systems and more particularly to techniques used in connection with distributed file systems and providing a consistent snapshot thereof.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Host systems may receive requests from clients in accordance with a variety of different protocols and different versions thereof including, for example, file access protocols, and block service requests. With a file access protocol, clients issue requests to access a file system. Such clients do not have direct access to the underlying block storage but rather interact with one or more hosts acting as file servers providing file system services based on a particular file access protocol. A variety of different data services may be used in connection with a data storage system. Such data services may include data replication and backup facilities that may vary with the underlying data storage system.

In some systems, clients accessing data in a file system may communicate through a single communication or access point on a server. The server and underlying data storage system where the file system is stored have limited resources for use in connection with servicing client requests. Thus, it may be desirable to use efficient techniques such as in connection with the file system, servicing client requests and providing various data services in order to better utilize resources and respond to client requests in a timely manner.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
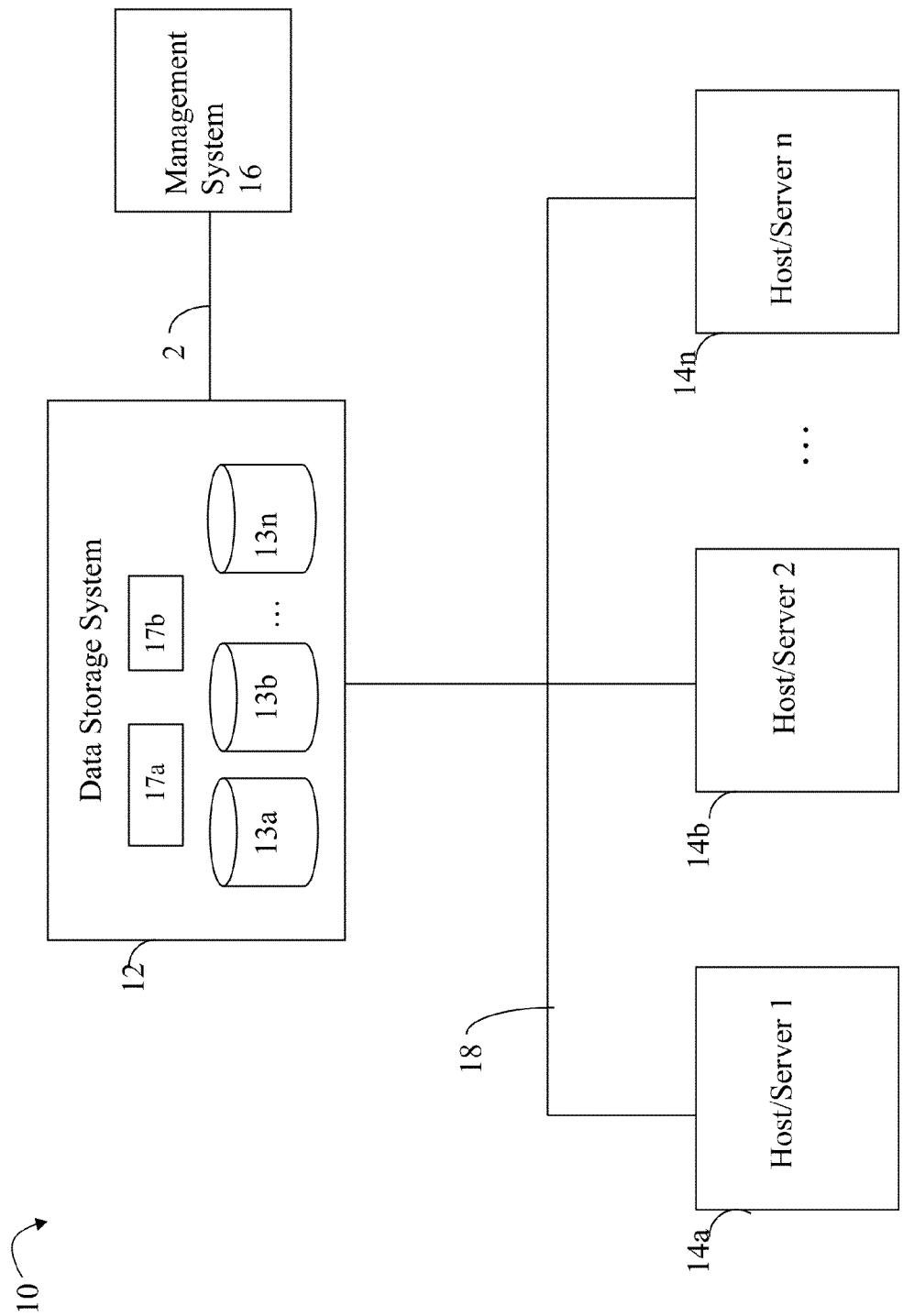
FIG. 1 is an example of a data storage system, management system and hosts that may be included in an embodiment utilizing techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication media 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication media 18 and 2, a variety of different communication arrangements and techniques may be used such as directly connected SCSI, SCSI over Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems and management system 16 may include code thereon for performing the techniques as described herein.

Servers or host systems, such as 14a-14n, provide data and access control information through channels to the storage systems, and the storage systems may also provide data to the host systems also through the channels. The host systems might not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

A data storage system, such as single data storage array, may include multiple storage processors or computer processing units. Techniques herein may be more generally use in connection with any one or more data storage system each including a different number of storage processors than as illustrated herein. The data storage system 12 may be a data storage array, such as a CLARiiON® data storage array by EMC Corporation of Hopkinton, Mass., including a plurality of data storage devices 13a-13n and two storage processors 17a, 17b. The storage processors (SPs) 17a, 17b may be computer processing units included in the data storage system for processing requests and commands. Additionally, the two storage processors 17a, 17b may be used in connection with failover processing when communicating with the management system 16.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
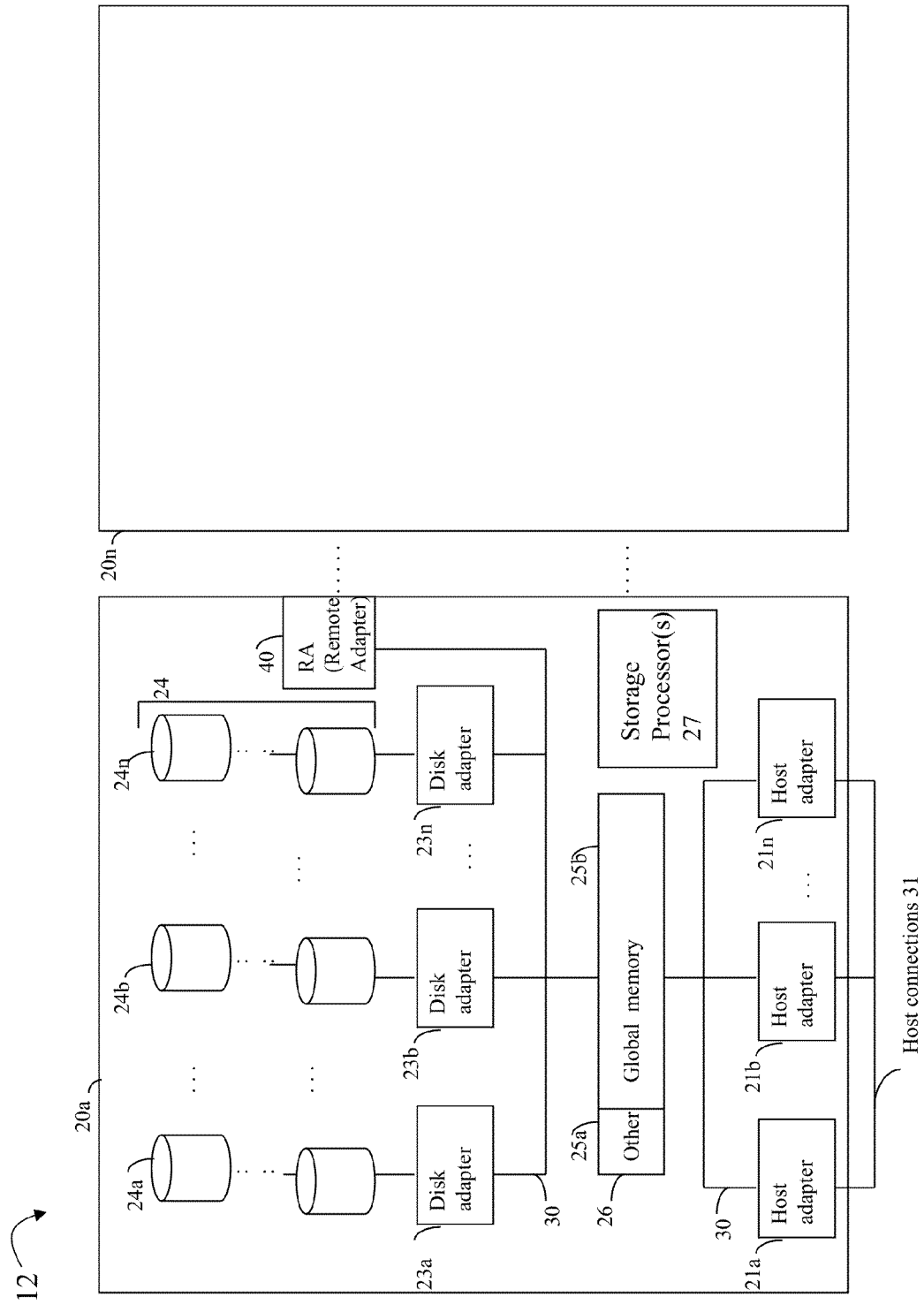
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be a CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

Also shown in the storage system 20a is an RA or remote adapter 40. The RA may be hardware including a processor used to facilitate communication between data storage systems, such as between two of the same or different types of data storage systems.

The physical data storage devices 24a-24n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

An embodiment may have one or more defined storage tiers with respect to data storage provided by one or more data storage systems. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as a rotating FC (fiber channel) disk drive, a rotating SATA (Serial Advanced Technology Attachment) disk drive), and the like. Data protection may specify a type or level of data storage protection such, for example, as a particular RAID level (e.g., RAID1, RAID-5 3+1, RAID-5 7+1, and the like). Performance characteristics may relate to different performance aspects of the physical storage devices of a particular type or technology. For example, there may be multiple types of FC disk drives based on the RPM characteristics of the FC disk drives (e.g., 10K RPM FC drives and 15K RPM FC drives) and FC disk drives having different RPM characteristics may be included in different storage tiers. Storage capacity may specify the amount of data, such as in bytes, that may be stored on the drives. To further illustrate, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives, and a third tier of all SATA drives. The foregoing are some examples of tier definitions and, of course, other tier definitions may be specified.

Figure 3A:
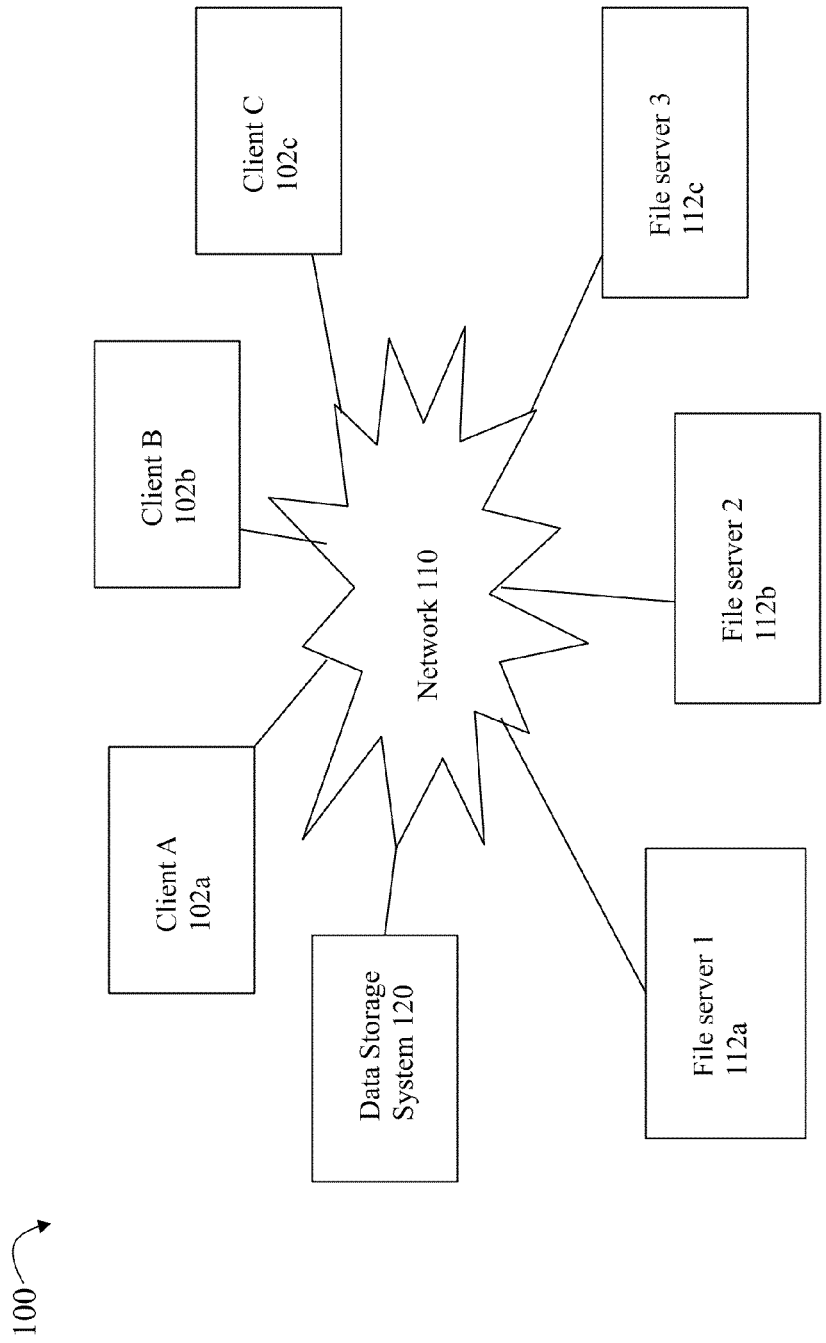
FIG. 3A is an example illustrating clients and file servers in a network configuration in an embodiment in accordance with techniques herein.

Referring to FIG. 3A, shown is an example of a system and network including components in an embodiment in accordance with techniques herein. The example 100 includes client computer systems 102a-c, data storage system 120, network 110 and file servers 112a-c. The data storage system 120 may be one or more data storage systems as described elsewhere herein such as in connection with FIGS. 1 and 2. Each of 112a-c, 102a-c and 120 may communicate with each other over network 110. Although a particular number of clients and file servers are illustrated in the example 100, an embodiment may include generally any number of one or more clients and one or more file servers for use in connection with techniques herein. Each of the file servers 112a-c may be a suitable computer system for use in connection with processing received client requests. The clients 102a-c may be any computer system such as a laptop or desktop computer. As described in more detail below, the file systems and associated services provided by file servers 112a-c may comprise a distributed file system in accordance with techniques herein. The file servers 112a-112c may collectively serve as a front end to the entire distributed file system comprising multiple file systems whereby such file servers provide for parallelism and scalability as will be appreciated by those of ordinary skill in the art. The network 110 may be an IP (internet protocol) network.

Figure 3B:
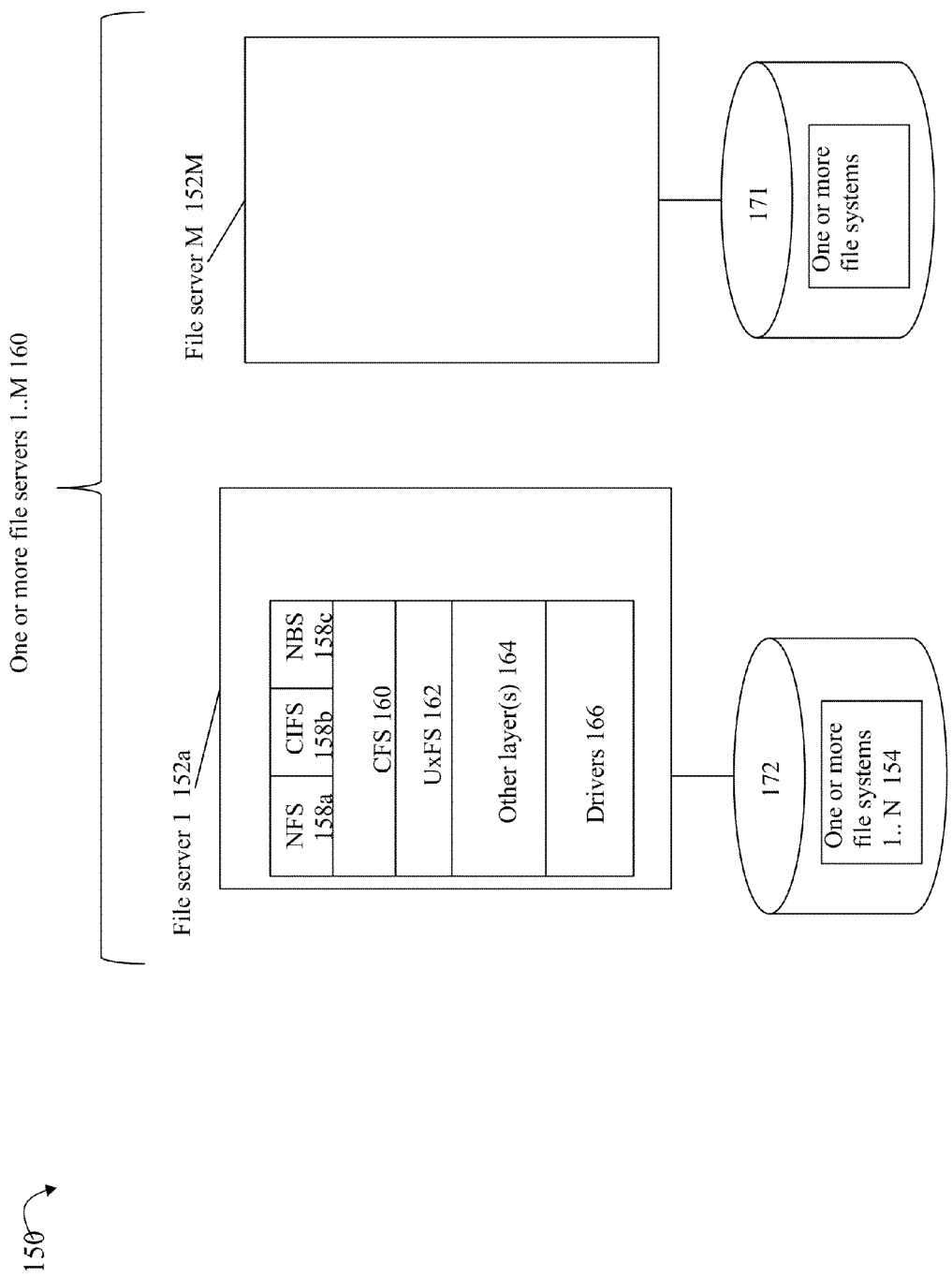
FIG. 3B is an example illustrating further detail of the one or more file servers as may be included in an embodiment in accordance with techniques herein.

Referring to FIG. 3B, shown is an example providing further detail regarding the file servers as may be included in an embodiment in accordance with techniques herein. The example 150 generally illustrates that an embodiment may include any number of M file servers 160, M being an integer of one (1) or more. The M file servers may be included in a federated file system in an embodiment having a distributed architecture as described herein. Details are provided regarding a single file server 152a for illustration where file server 152a may include the illustrated set of components and may store data for one or more file systems 154 on storage devices denoted generally by element 172. However, each of the M file servers may include similar components as illustrated for 152a and may store data for additional one or more file systems on a storage device in a manner similar to that as illustrated for 152a. For example, each of the file servers 152a-152M may include a set of components 158a-c, 160, 162, 164, 166, where each of the file servers 152a-152M may store data for one or more file systems on one or more storage devices. The file server 152a may be a multi-protocol file server able to communicate with clients in a variety of different protocols.

The file server 1 152a may communicate with the other network devices such as the clients using standard file access protocols such as the Network File System (NFS) or the Common Internet File System (CIFS) protocols. The file server 152s may utilize an operating system such as a Unix-based operating system or an embedded operating system. The file server 152a may include a Network File System (NFS) module 158a for supporting communication among the clients and the server 152a over the IP network 110 using the NFS file access protocol. The server 152a may also include a Common Internet File System (CIFS) module 158b for supporting communication over the IP network using the CIFS file access protocol. The server 152a may also include a network block services (NBS) module 158c for exporting to the clients LVs as may be included in a storage device 172 of the data storage system 120. The NFS module 158a, the CIFS module 158b, and the NBS module 158c may be layered over a Common File System (CFS) module 160, and the CFS module may be layered over one or more physical file systems, each of which implement a specified file system interface (such as a Virtual File System interface). Such physical file systems include support for persistent data structures required to implement the protocol supported, such as those to support CIFS and NFS. An example of such a physical file system is a UnixFile System (UxFS) module 162. The UxFS module supports a UNIX-based file system, and the CFS module provides higher-level functions common to NFS, CIFS, and NBS. One or more other layers 164 may be included under the UxFS layer 162 whereby the lowest such layer(s) represented by 164 may communicate with one or more drivers 166. The drivers 166 may include, for example, FC, SCSI or iSCSI drivers to facilitate communications between the adapters or interfaces of the server 152a and the data storage system. The file server 152a may also include other components than as described herein.

The NFS protocol may be used to receive file access commands from clients using, for example, the UNIX™ operating system or the LINUX™ operating system. The CIFS protocol may be used to receive file access commands from clients using, for example, the Microsoft (MS) Windows® operating system. The NFS protocol is described, for example, in "NFS: Network File System Protocol Specification," Network Working Group, Request for Comments: 1094, Sun Microsystems, Inc., Santa Clara, Calif., March 1989, 27 pages, and in S. Shepler et al., "Network File System (NFS) Version 4 Protocol," Network Working Group, Request for Comments: 3530, The Internet Society, Reston, Va., April 2003, 262 pages. The CIFS protocol is described, for example, in Paul J. Leach and Dilip C. Naik, "A Common Internet File System (CIFS/1.0) Protocol," Network Working Group, Internet Engineering Task Force, The Internet Society, Reston, Va., Dec. 19, 1997, 121 pages, and "Implementing CIFS: The Common Internet File System", Christopher Hertel, Prentice Hall Professional Technical Reference, 2003, ISBN ISBN:013047116X.

An embodiment in accordance with techniques herein may also process client requests of different versions of the same protocol such as, for example, NFS V3.0, NFS V4.0 and/or NFS V4.1. NFS V 4.1 provides protocol support to take advantage of clustered server deployments including an extension (that may be referred to as pNFS (parallel NFS) extension) to provide scalable parallel access to files distributed among multiple servers. The pNFS functionality may be included in such a protocol supported in an embodiment in accordance with techniques herein.

In connection with file access protocols as may be used by a client, the file server 152a may be used in connection with servicing client requests to access files of a distributed file system in an embodiment in accordance with techniques herein. The distributed file system as will be described in more detail elsewhere includes two or more file systems. More specifically, the distributed file system in accordance with techniques herein includes one or more metadata file systems (MDFSs) and one or more data file systems or data storage file systems (DSFSs). Each MDFS stores metadata about files in the file system and each DSFS stores file content data. For a given file of the file system, the file's metadata is stored in a file system (e.g., an MDFS) separate from its corresponding file data or content which is stored in one or more DSFSs. The file's data may be striped across multiple DFSs where the striping size may possibly vary on a per file basis. For such a distributed file system, the techniques herein further provide for creating a consistent snapshot of one or more designated files of the file system and for also creating a consistent snapshot for an entire file system.

With reference to FIG. 3B, file server 152a may service requests for one or more file systems (denoted 1 ... N) 154 having data storage on one or more storage devices 172 of the data storage system. In accordance with techniques herein, the N file systems denoted by 154 may be included in a collective federated file system having a global name space. The global namespace aspect is described in more detail elsewhere herein. Each file system instance denoted as one of the N file systems of 154 may be either an MDFS or a DSFS. Each of the N file systems (N being an integer having a value of 1 (one) or more) may include its own file system metadata and includes data which may be either metadata (if the file system is a MDFS) or file content data (if the file system is a DSFS) for a file in the distributed file system. For example, consider the case of a distributed file system where file server 152a includes a single MDFS and another three file servers denoted by 160 each include a single DSFS. The MDFS may include the metadata for all files of the distributed file system and the other 3 file servers may include the file content data for all files of the distributed file system. The MDFS itself as a file system includes its own appropriate file system metadata and further includes metadata files for files of the distributed file system. In a similar manner a DSFS of the distributed file system may include its own file system metadata and further includes as its content data the file content data for files of the distributed file system. In this manner, a file X of the distributed file system has its metadata partitioned from its file content data whereby X's metadata is stored in the MDFS (e.g., files of the MDFS contain X's metadata) and X's file content data is stored in one or more DSFS (e.g., files of the DSFS contain X's file content data).

One embodiment of the techniques herein may include a single file server that includes both the MDFS and one or more DSFSs. To provide for greater scalability and efficiency, another embodiment of the techniques herein may include each of the MDFSs and each of the DSFSs on a different file server. As yet another variation, a single file server may include a single MDFS including all the distributed file system metadata and one or more other servers may each include multiple DSFSs. An embodiment may include multiple MDFSs wherein each MDFS may include metadata files for a portion of the files in a distributed file system. Embodiments may include these and other variations as described and represented herein.

With respect to a file in the distributed file system, the file's metadata is a data descriptor that describes the file and the file content or data. Metadata means data about the file data. Metadata for a file may, for example, include location information identifying the locations on one or more server systems where the file content is stored, and various file attributes (e.g., describing access control or file permissions, date the file was last accessed, date the file was last written to/modified, size of the file, and the like. Metadata may also be included about the file system (file system metadata) such as describing a file system's directory structure. In an embodiment in accordance with techniques herein, the MDFS may contain the file metadata for files of the distributed file system and may include pointers to the file data residing in the one or more DSFSs for a particular file. Additionally, the MDFS may include the file directory structure for the distributed file system. As an example for file X, X's metadata is stored in the MDFS which includes X's file metadata and also includes one or more pointers to X's file content data residing on one or more DSFS. It should be noted that the pointers to X's file content as included in X's metadata file may be more generally referred to as globally unique pointers to data files including X's content data residing on one or more DSFS. An embodiment in accordance with techniques herein may include any one or more suitable globally unique pointers in a metadata file to identify the data files. For example, a metadata file for X may include any one or more of file handles, fully qualified path names, and the like, as a globally unique pointer to X's file content data. As also described herein, X's file content data may be striped across multiple DSFSs.

In an embodiment including a single MDFS, the MDFS includes a single metadata file for each file in the distributed file system. The file content data for each file may be located in one or more DSFSs depending on the embodiment, whether striping is utilized, and if so, depending on the stripe size and the size of the file contents. For example, consider the case where two DSFSs are used in an embodiment with a stripe size of 8 KB. If the length of the file contents is 16 KB, the first 8 KB portion (e.g., 1-8 KB) may be stored on a first DSFS and the second remaining 8 KB portion (8 KB+1 through 16 KB) may be stored on a second DSFS. If the file size is increased by another third 8 KB (having file relative offset locations of (16 KB+1 through 24 KB), the third 8 KB portion may be stored in the first DSFS. An embodiment may also provide for optimizations or special cases, for example, where file content is less than a threshold small amount (e.g., perhaps less than a stripe size) and in such cases, the file content may be stored in the MDFS itself.

An embodiment may also provide for a single stripe size for all files, may have a varying or customized stripe size that may vary per file, for a single data file, and/or may have multiple stripe sizes for different corresponding parts of a same file (e.g., portion 1 of file 1 has a first stripe size and portion 2 of file 1 has a second different stripe size).

The MDFS may perform processing in connection with providing metadata for a file of the distributed file system. The metadata for the file may include information such as the attributes and other properties described above. The metadata for the file may also include layout data which identifies where the different portions of the file content data are stored as also described above. As also described elsewhere herein, the layout data (as utilized by the MDFS and as may be included in a metadata file) may generally identify where the different portions of file content data are stored by including one or more globally unique pointers or identifiers. For example, the layout data may identify which data portion of the file contents are stored on which DSFS using a globally unique pointer or identifier that is a fully qualified name (FQN) or path for the data portion. The FQN may identify the file server and location (e.g., such as a directory) where the file content data portion is stored. Alternatively, or in addition to the FQN, an embodiment may include a file handle for each such data portion in the layout information for the file. The foregoing are some examples of a globally unique pointer or identifier that may be used in an embodiment.

In an embodiment including a single MDFS on a first server and multiple DSFSs located on different servers, a client may communicate using the pNFS protocol. The client may request the metadata from the MDFS and then subsequently the client may directly issue in parallel multiple requests to the different servers including the DSFSs. An embodiment in accordance with techniques herein may provide for determining and recognizing a protocol used by a client and may perform additional processing to take advantage of the distributed file system described herein when the client does not communicate using the pNFS protocol. In accordance with techniques herein, the file server(s) may process client requests where the client does not communicate using the pNFS protocol and where the client may furthermore communicate in accordance with a protocol that does not utilize some aspects of metadata. For example, a client may communicate in accordance with a version of an NFS protocol that does not utilize or recognize layout information. In such a case, for example, the client may communicate using a protocol such as NFS V3.0 and issue a request to the MDFS for file data. The client would expect the MDFS to simply return to the client the requested data. In this case, the MDFS (and/or other components in communication with the MDFS) may perform additional processing on behalf of the client request to take advantage of the distributed architecture of the distributed file system and file servers. The MDFS (or other component in communication with the MDFS) may perform processing to determine from the layout information of the file metadata the particular DSFSs which include the requested file content. The MDFS or other such component may issue requests in parallel directly to the particular DSFSs to obtain the requested data portions of the file. The MDFS may then return the requested data directly to the client. In this manner, the client request results in the MDFS indirectly obtaining the file content data for the client request for the client. Thus, the software of the file server including the MDFS may orchestrate or coordinate obtaining the requested file content data in parallel for the client request.

It should be noted that the particular protocol including the protocol version used by a client may be included in information providing the client in an initial message exchange (e.g., such as parameters of a command as described elsewhere herein).

Figure 4:
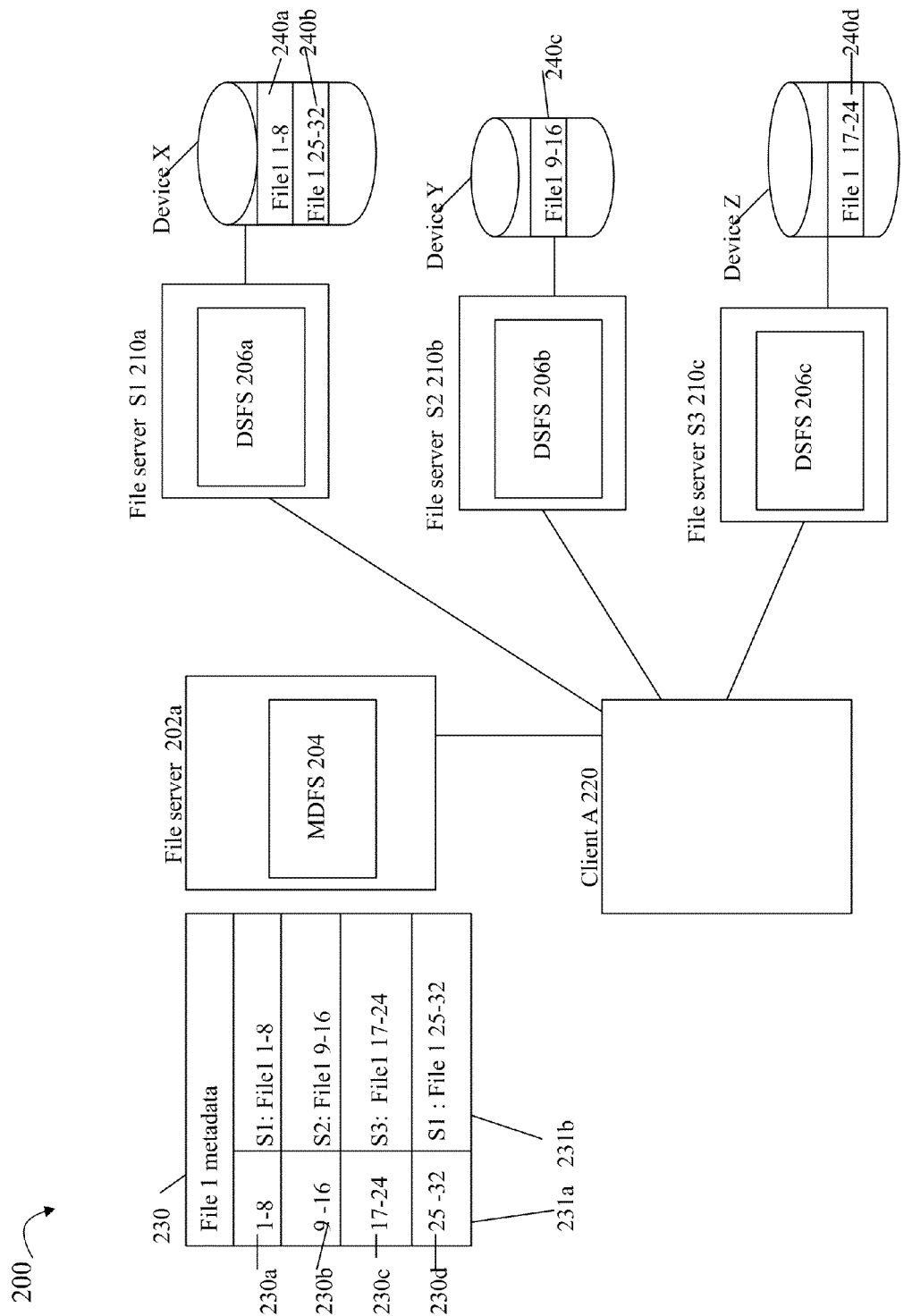
FIG. 4 is an example illustrating a distributed file system in an embodiment in accordance with techniques herein.

Referring to FIG. 4, shown is an example of an embodiment in accordance with techniques herein. The example 200 illustrates an embodiment including file servers 202a, and 210a-210c. The MDFS 204 for the distributed file system may be located on or hosted by file server 202a. The distributed file system may also include file servers S1 210a, S2 210b and S3 210c each including a different single DSFS. Server S1 210a includes DSFS 206a. Server S2 210b includes DSFS 206b and server S3 206c includes DSFS 206c. Devices X, Y and Z may denote data storage devices of a data storage system used to store file content data by the servers 210a-210c. The client A 220 may issue a request to the MDFS 204 to obtain the metadata for FILE1. Element 230 represents the metadata for FILE1 as may also be stored on a storage device accessible to server 202a. Assume that data for files is striped across the DSFSs 206a-206b in 8 KB stripes.

In a first example, assume that client A 220 communicates using pNFS and therefore requests the metadata for FILE 1. The metadata returned may include the information illustrated in 230. Element 230 represents that FILE1 has file data content partitioned into 4 portions—a first portion including kilobytes (KBs) 1-8 as denoted by 230a, a second portion including KBs 9-16 as denoted by 230b, a third portion including KBs 17-24 as denoted by 230c and a fourth portion including KBs 25-32 as denoted by 230d. Each of the rows 230a-230d includes a pointer to (e.g., identifies a location of) one of the four data portions of FILE1. As described elsewhere herein, such pointers may be instances of globally unique pointers or identifiers to the data portions of FILE1. Column 231a denotes portions of the file content data of FILE 1 (e.g., such as in KB units which are offsets from the beginning of FILE 1). Column 231b includes globally unique identifiers denoting the locations of (e.g., points to) the actual file content data for each portion of FILE1's content where the globally unique identifiers may be, for example, a file handle or a fully qualified path name that points to the associated data files. For purposes of illustration, following is use of a fully qualified path name as one exemplary form of information that may be used as globally unique identifiers. Each of the servers 210a-210c respectively has a unique server name S1, S2 and S3 as specified in rows of 231b thereby identifying the servers including the data portions of FILE 1. For example as illustrated by 230a, the first 8 KB portion of FILE 1 is located on server S1 210a in the file 240a named "FILE1 1-8". As illustrated by 230b, the second 8 KB portion of FILE 1 is located on server S2 210b in the file 240c named "FILE1 9-16". As illustrated by 230c, the third 8 KB portion of FILE 1 is located on server S3 210c in the file 240d named "FILE1 17-24". As illustrated by 230d, the fourth 8 KB portion of FILE 1 is located on server S1 210a in the file 240b named "FILE1 25-32".

In this manner, the client A 220 may issue a request to MDFS 204 for FILE 1 metadata, receive in response the metadata 230, and then directly communicate with 210a-210c in parallel to obtain the 4 data portions of FILE 1. It should be noted that each DSFS may have a unique file system identifier and, as further described elsewhere herein, the metadata of 230 may be used to specify for each data portion of FILET a fully qualified path or file name. In this case, the fully qualified path for each data portion may include a portion (e.g., such as a particular directory in the path) for each file system. For example, if DSFS 206a has a unique file system identifier of ID1, the fully qualified path name for portion 240a may be "S1:ID1\File1 1-8". The layout information returned to the client may be in a form in accordance with a standard utilized by the client. Depending on the form of the globally unique identifiers of the layout information 230 as stored and utilized internally by the MDFS, the layout information 230 may be accordingly mapped into a suitable form as needed for returning to the client. For example, as described elsewhere herein, the LAYOUT_GET command may return file handles to the client to denote the location of each data portion. In an embodiment in which the layout information of MDFS includes fully qualified path names rather than file handles, processing may be performed to map the path names to corresponding file handles and then return the file handles (along with other appropriate information) to the client. As an alternative, an embodiment may store the file handles, alone or in addition to, the path names in the layout data 230 and may then return the file handles as already included in the layout data 230 without performing the above-mentioned processing to map the path name to a corresponding file handle for the data portions. It should be noted that a file handle, as described elsewhere herein, may be comprised of multiple pieces of data where each piece may correspond, for example, to a file system identifier, inode, generation, and the like. Thus, the processing to map a path name to a corresponding file handle may include mapping portions of the path name to corresponding portions of the file handle.

Figure 5:
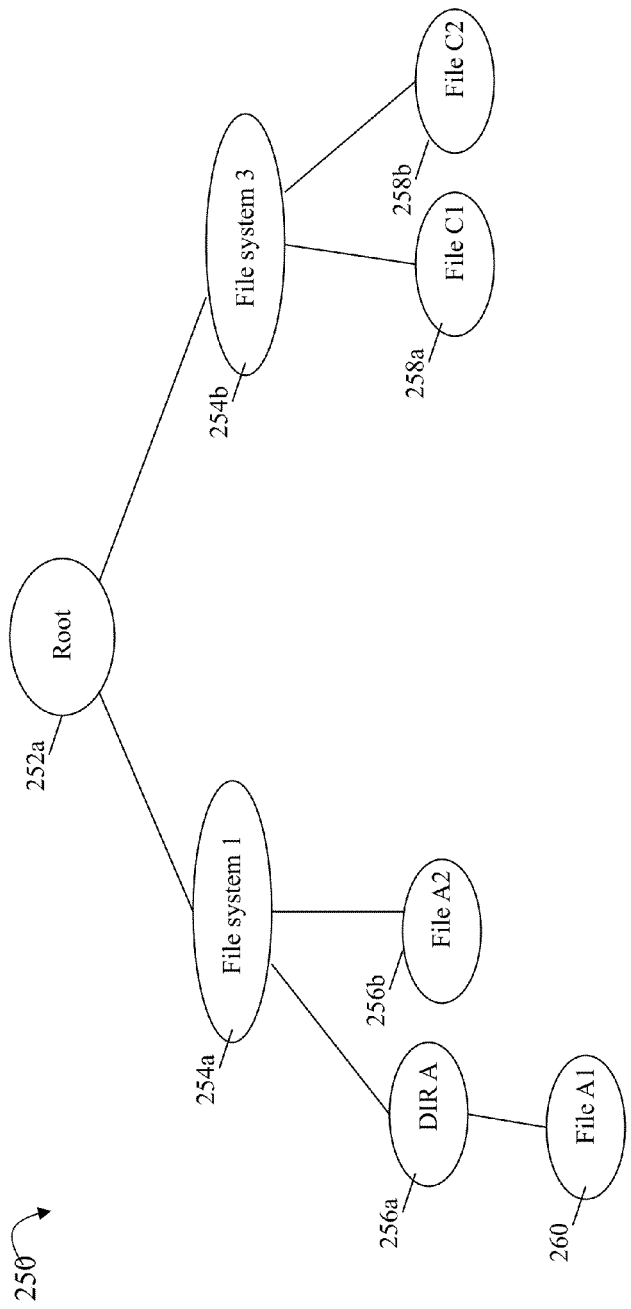
FIG. 5 is an example of a consolidated hierarchical view of a distributed file system as may be presented to the client in an embodiment in accordance with techniques herein.

In connection with presenting information to the client for the distributed file system, an embodiment may provide the client with a consolidated view representing the logical aggregation of all underlying MDFSs and DSFSs. In this manner, the distributed file system may have a namespace which may be represented from the client's perspective as a single hierarchical directory structure with a root node such as illustrated in FIG. 5. The distributed file system namespace may be characterized as having two aspects or attributes regarding organization—a first is how the namespace is organized from the user or client perspective and a second is how the namespace is organized or configured from the distributed file system's view point.

It should be noted that the consolidated view may be provided to a client which requested such information using, for example, an application programming interface (API), command line interface (CLI), or any other suitable interface for client communications. The resulting consolidated view may be represented to the client using any suitable form, data structure, and the like. The client may utilize the consolidated view for any purpose that may vary with the particular client. For example, the client may request information regarding the consolidated view and then display the resulting consolidated view on a graphical user interface for interaction with a user. The client may be a software application using an API which requests the consolidated view for processing by the application such as for selecting a file system or a file to be snapshot.

With reference to FIG. 5, shown is an example of a representation of the distributed file system's namespace as may be logically presented to the client. The example 250 illustrates a hierarchical structure which forms a tree having nodes and multiple levels. The root node 252a is located at a first level, nodes 254a-b are located at a second level, nodes 256a-b and 258a-b are located at a third level and node 260a is located at a fourth level. The hierarchical structure 250 is akin to a file directory structure or hierarchy as may be included in a desktop environment of a computer system for files organized thereon. Files are leaf nodes (e.g., 260, 256b, 258a-b). A path from the root to a leaf node denotes a directory path in the namespace hierarchy for the file.

The root node 252a may represent the root of the distributed file system. In this manner, the underlying distributed file system organization into MDFSs and DSFSs may be transparent to the client when represented in this aggregate form. For example, the distributed file system may include files stored in two file systems—File system 1 254a and File system 3 254b. Elements 258a-b may represent files in file system 3 254b. File system 1 254a may include a directory DIR A 256a and a file A2 256b. Directory DIR A 256a may include file A1 260.

It should be noted that the namespace of this consolidated view is contrast to the namespace associated with the underlying MDFS and DSFSs. The consolidated logical namespace hierarchy may be accordingly mapped onto such underlying MDFS and DSFSs as described below in more detail.

Various standards may be used to define the syntax and semantics of how two such hierarchical logical namespaces of the file systems 254a-b may be combined. For example, an embodiment may associate namespaces of file systems 254a-b using the Lightweight Directory Access Protocol (LDAP).

In accordance with techniques herein, an MDFS may include the file metadata and other metadata describing the directory structure illustrated in FIG. 5, and one or more DSFSs may include the file content data such as file content for files denoted by 260, 256b, and 258a-b. In other words, the logical namespace hierarchy of FIG. 5 may be mapped onto a collection or set of one or more MDFSs and DSFSs. Generally, the logical structure of FIG. 5 may be described using metadata objects. A metadata object of a first type may include directory metadata for a directory. A metadata object of a second type may be file metadata for a file of the distributed file system and may be referred to as a metadata file for a file. A metadata object of a third type may be a junction to provide a connection to a file system. Junctions are described elsewhere herein in more detail. Metadata objects such as noted above may be included in an MDFS. Generally, each metadata object may point to a data file in a DSFS (if the metadata object is a metadata file of the second type above) or may point (e.g., such as via redirection) to one or more other second metadata objects in an MDFS (e.g., such as if the metadata object is of the first or third type described above).

Figure 6:
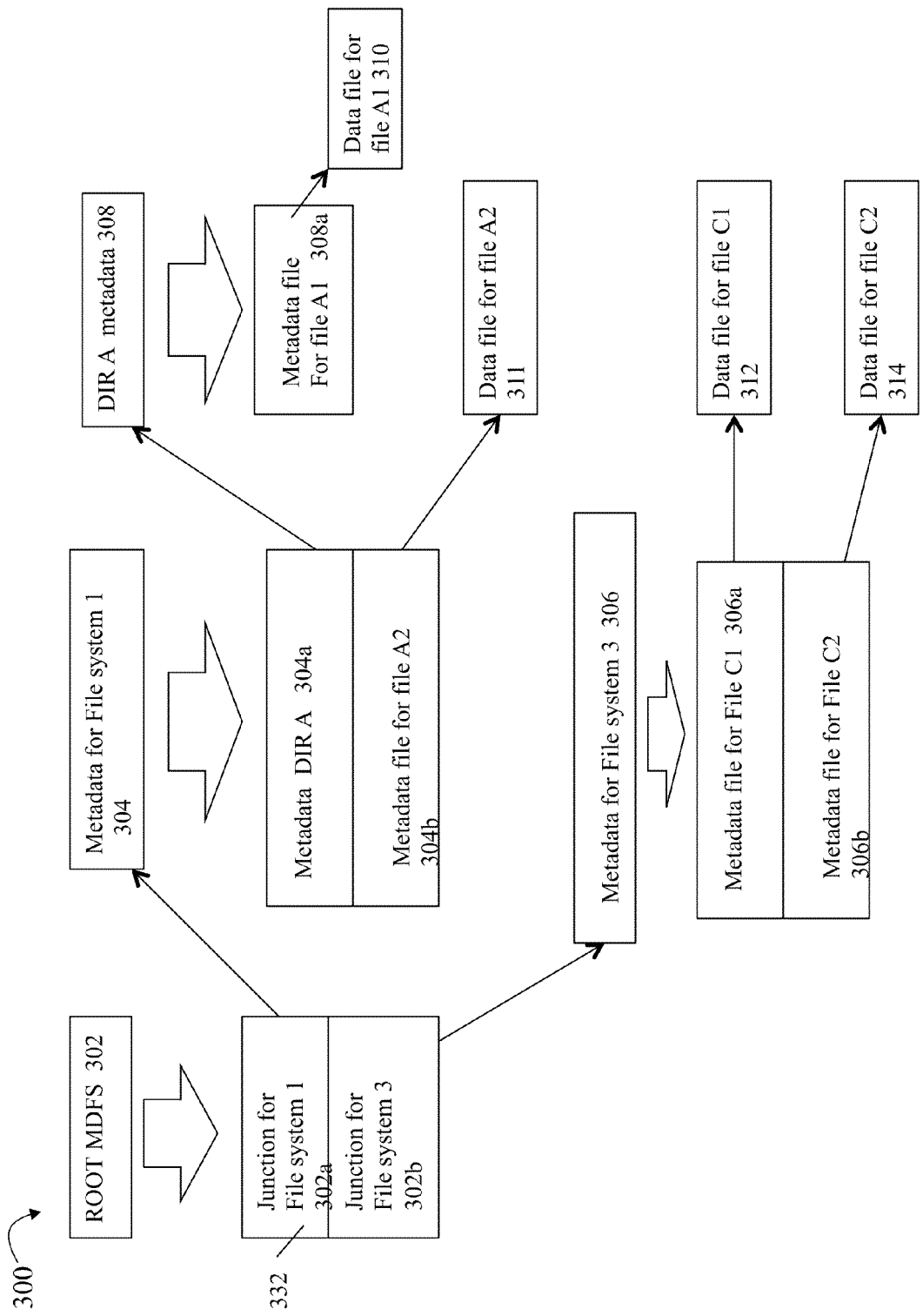
FIG. 6 is an example illustrating underlying metadata and data in accordance with the representation of FIG. 5.

If the second metadata object is a metadata object for a directory or a junction, then the user's logical directory hierarchy is further extended. Thus, a metadata object may identify (e.g., point to) another metadata object in an MDFS (thereby extending the hierarchy), OR may identify (e.g., point to) a file that is a content data file in a DSFS. For example, with reference now to FIGS. 5 and 6, the root 252a may be described using a metadata object 302 for a root directory and may be included in the MDFS. The metadata object 302 for the root directory 252a may identify two other metadata objects 302a, 302b corresponding respectively to nodes 254a-254b. The metadata object 302a may be a junction including the metadata for file system 1 directory (254a). Element 304 may represent the metadata for file system 1 as described by the metadata object 302a. Metadata object 302b may be a junction including the metadata for file system 3 directory (254a). Element 306 may represent the metadata for file system 3 as described by the metadata object 302b. The metadata for file system 1 304 may identify two other metadata objects 304a, 304b corresponding respectively to nodes 256a-256b. The metadata object 304b may be a metadata file identifying a data file 311 for file A2 (node 256b) in a DSFS. Element 308 may represent the metadata for DIR A (node 256a) as described by the metadata object 304a. Thus, the metadata object 304a may further extend the hierarchy by pointing to another metadata object 308a corresponding to a metadata file for file A1. The metadata file 308a for file A1 may identify a data file 310 for file A1 (node 260) in a DSFS. Element 306 (representing the metadata for file system 3 as described by junction object 302b) may identify two other metadata objects 306a, 306b corresponding respectively to nodes 258a and 258b. Metadata object 306a may be a metadata file for file C1 (node 258a) identifying a data file 312 for file C1 in a DSFS. Metadata object 306b may be a metadata file for C2 (node 258b) identifying a data file 314 for file C2 in a DSFS.

It should be noted that a metadata file, such as 306a, may identify a location of a data file in a DSFS by specifying, for example, a file server name, port number, file name including directory or other complete path information, and the like. In a similar manner, a metadata object may also identify another metadata object included in an MDFS.

In connection with various file protocols, a client may use a file handle uniquely identifying a file in the file system. For example, when an NFS client wants to open/access a file, the client does a LOOKUP to obtain the file handle. The client uses this handle for subsequent operations. The client may then issues read and write operations to the file using the file handle. When the client first does a lookup, the MDFS may determine information regarding the client (referred to as client context information) such as the protocol used/understood by the client. MDFS, in turn, then places such client context information (or portions thereof) such as regarding the client's protocol, in the file handle returned to the client. In this manner, subsequent uses of the file handle such as in connection with I/O operations propagate the client context information such as related to the client's protocol thereby allowing the server and MDFS to know how to respond to the client (e.g., based on what protocol) and what processing to perform to complete the client request. The file handle identifies or maps a named file in the client's consolidated name space view to the underlying DSFS location. The file handle may include, for example, the file system ID uniquely identifying the file system, a file ID (e.g., inode number), a generation count and client context or client specific information. Client context information may include the protocol understood by the client for use with the file (e.g., NFS V3, V4, etc.). The generation count may uniquely identify that file ID since file IDs may be reused by a DSFS such as when the file is deleted. It is the combination of the file ID and generation count that may be used to uniquely identify the file. The generation count may be incremented each time the file ID is reused. When the client performs an operation using the handle, the server can determine the client protocol included as part of the handle.

Figure 6B:
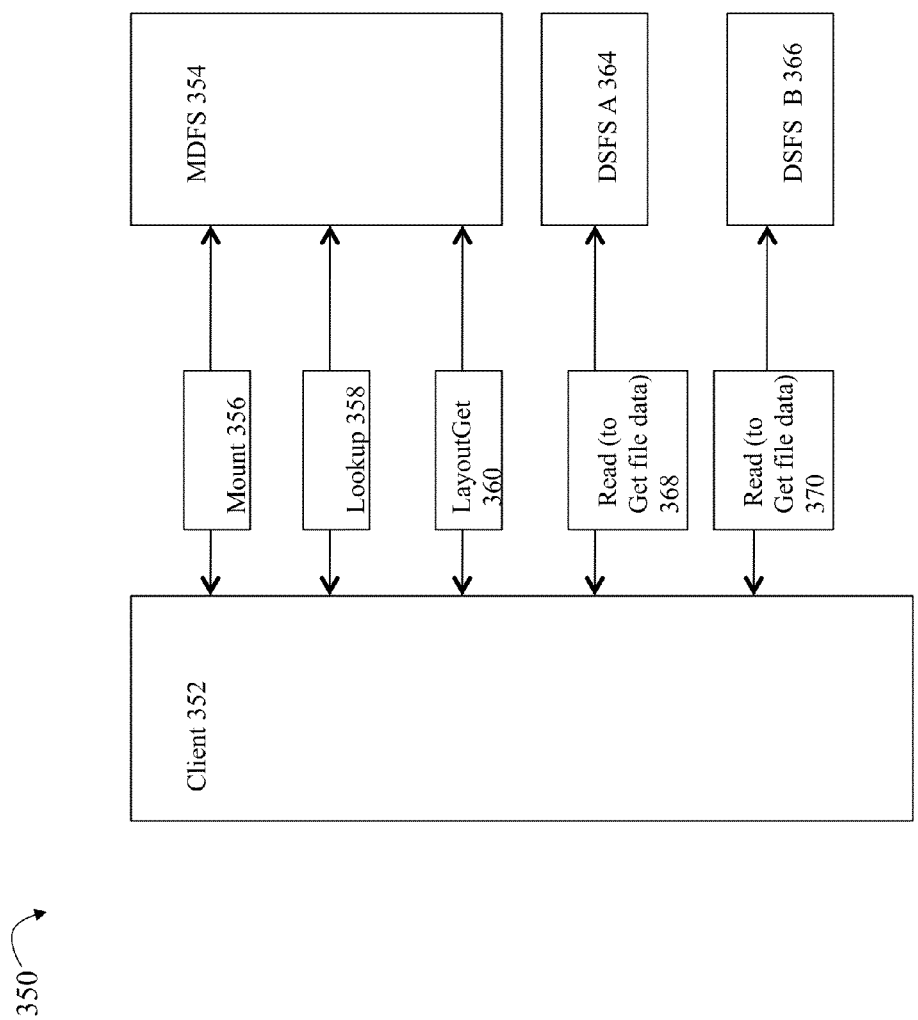
FIG. 6B is an example illustrating messages that may be exchanged between the client, a metadata file system (MDFS) and data storage file systems (DSFSs) in an embodiment in accordance with techniques herein.

As an example exchange of client requests and responses, reference is made to FIG. 6B where client 352 may be an NFS V4.1 client which operates in accordance with the pNFS protocol. The client 352 communicates with MDFS 354 issuing a series of requests 356, 358 and 360. The client 352 may then communicate with DSFS A 364 by issuing request 368 to obtain a first portion of desired data and then with DSFS B 366 by issuing request 370 to obtain a second portion of desired data. Each of 356, 258, 360, 368 and 370 is illustrated with double directional arrows to represent the sending of the request from client 352 and the associated response returned to client 352.

The client 352 communicates with an MDFS 354 by issuing a first request 356 as part of mounting the file system. It should be noted that MOUNT may not be a specific operation or command of the standard but may rather be performed as part of another operation depending on the particular version of NFS. An administrator may not want to expose the client to the root but may rather expose or restrict the client to only portion of the overall hierarchy such as illustrated in FIG. 5. The client in this example may be restricted to a portion of the namespace via configuration files on the server and/or MDFS. For example, the configuration files may allow the server to restrict access of the namespace presented in FIG. 5 for the client. For example, the client may be a client from FINANCE and for such clients, the client may be presented as its home directory (root\finance). Next, the client may perform a lookup request 358 for file ABC.DB (database file) to MDFS 354. The lookup request may include the file path (directory and file name) in the client's consolidated namespace view such as of FIG. 5. Returned to the client is the FILE HANDLE for the file of interest. The client 352 may then issue a LAYOUT GET command 360 using the file handle to the MDFS 354. In response, returned to the client is the metadata for file ABC.DB. In this example, MDFS returns to client 352 the metadata for file ABC.DB since the client knows about metadata. As known in the art, the LAYOUT_GET command returns the storage system perspective of the file data (e.g., where or which DSFS the client has to communicate with to request the desired data for file ABC.DB). In this example, the data or content of file ABC.DB is stored in portions on various DSFS so the LAYOUT_GET request may return layout information of each such data portion. For example, if the file ABC.DB is stored in two DSFSs on two different servers, the information returned from LAYOUT_GET may include, for each data portion, the file offset or range for the portion, and a file handle in a DSFS identifying the file where the data portion is stored. It should be noted that the client may use other services to map a given file handle to a file server upon which the DSFS including the data portion is located. More generally, processing may be performed (such as by an MDFS, DSFS, or other component as appropriate for a particular operation) to map the file handle for a data portion as needed to a complete or fully qualified path name or other globally unique identifier (as may be used by a component of the system herein) identifying the DSFS, the file server on which the DSFS is located, the file name of the contents/file data as stored on the DSFS, and an associated generation number. For example, the layout information returned by 360 to the client may include the file handle and file offsets denoted below whereby the client may use other facilities for mapping the file handle to the server ID:

| Server ID | File handle for data portion | File offset |
| --- | --- | --- |
| Server A | File handle for portion 1 | 1-50 |
| Server B | File handle for portion 2 | 51-100 |

Furthermore, each data portion's file handle may be mapped to a fully qualified path denoting the "Location" of the file such as:

| File handle for data portion | Location (path name) | File offset |
| --- | --- | --- |
| File handle for portion 1 | Server A:\DSFS A\ABC.DB_CHUNK1 | 1-50 |
| File handle for portion 2 | Server B:\ DSFS B\ABC.DB_CHUNK2 | 51-100 | indicating that the first 50 units (such as KBs of the first data portion) of file ABC.DB are located on file server "Server A" in directory "DSFS A" (for file system A) in file "ABC.DB_CHUNK1". Similarly, the above-mentioned information indicates that the next 50 units (such as KBs for the second data portion) of file ABC.DB is located on file server "Server B" in directory "DSFS B" (for file system B) in file "ABC.DB_CHUNK2". In connection with FIG. 6B, DSFS A 364 may be located on Server A and DSFS B 366 may be located on Server B as denoted in the above-mentioned information. Additionally, data files of DSFS A 364 are included in the directory "DSFS A" on Server A and data files of DSFS B 366 are included in the directory "DSFS B" on Server B.

The client 352 may now communicate directly with the DSFSs to access the desired data portions for reading, writing and the like, using the returned layout information for the data portion(s). For example, the client 352 may issue a request 368 to DSFS A 364 to get (READ) the first data portion of the file and may issue request 370 to DSFS B 366 to get (READ) the second portion of the file. The client 352 may issue such requests 368, 370 in parallel. In a similar manner, the client may also update or write to various portions of the file ABC.DB and send such updates regarding the file's contents to the appropriate DSFS. Although not illustrated, the client may also update the portions of file ABC.DB's metadata by communicating such updates to the MDFS. For example, other metadata that may be acquired and modified by the client 352 may be related to access controls provided to different user or groups. The DSFS or MDFS may perform processing as described above to map a file handle to the appropriate path name for the file.

If the client 352 uses a protocol or version whereby the client does not have support for requesting or using layout information for the file, the client 352 may send the READ request using the file handle directly to the MDFS 354 and expect the MDFS 354 to return the requested READ data without the client ever requesting the layout information and without having the client directly contact the various DSFSs to obtain the data.

When a client and server with which the client communicates support the pNFS feature of NFSv4.1, the client may directly access data stored on DSFSs using the layout information as described above. Use of the layout allows the client to request a READ or WRITE directly to the serve node on which the DSFS resides, typically by accessing a protocol implementation on that node, which then directly accesses the associated DSFS. Layouts may indicate the use of multiple DSFS's for a given file, allowing performance benefits through striping of data to multiple nodes.

NAS (network attached storage) protocols not aware of any distinction between MDFS and DSFS expect to access the metadata and file content data at a single network location or file server, which typically is that of the MDFS. One way to provide for that is for the MDFS to undertake the responsibility for forwarding READ and WRITE request to the appropriate DSFS, but it may be more effective to have other modules on the same server as MDFS (e.g., such as 158a or 158b of FIG. 3B) do such forwarding directly to the appropriate DSFS in most such cases. Even though the protocol definition may not be aware of the MDFS/DSFS distinction, the implementations of that protocol still can be aware of it, to great benefit. Thus, MDFS or other software module(s) with which the MDFS communicates may handle the routing and communications to obtain the requested data based on the layout information for those clients which do not utilize layout data and do not directly communicate with the DSFS.

What will be described is processing that may be performed to create a snapshot as a point in time copy of file and also of a user or client file system (e.g., based on view of FIG. 5 such as for "file system 1" including node 254a and all its descendant nodes). As known in the art, a snapshot may be characterized as a point in time logical image of data. In connection with files and a file system, software of a data storage system may provide one or more data protection services or facilities whereby a snapshot is one such facility. Generally, a snapshot may be made with respect to a source file thereby providing a point in time image of the source file. A snapshot may appear like a normal file and may be used for backup, testing, and the like. Snapshots may rely on any one or more techniques such as may be used, for example, to track source file changes from the time when a snapshot was created thereby identifying the differences between the source or production file and its snapshot. In this manner, techniques may be used to reduce the amount of data stored. For example, the snapshot and the source file may both be initially associated with a same set of data blocks. As changes are made to the source file, additional storage may be allocated as needed to store the updated data and then associated with the source file. Thus, a same data block common to both the source file and its snapshot may stored once and then associated with both the snapshot and the source file. As the source file is updated, the changed data may be stored in new disk space and associated only with the source file. Thus, rather than make a complete physical copy of the source file when creating a snapshot, the storage capacity required to implement snapshots may be considerably less than that of the source file. A snapshot of a file is a virtual point in time copy and requires access to the unchanged data in the source file. Therefore failures affecting the source file also affect the snapshot of the file. Snapshots of a file may be contrasted, for example, with other data services that may provide bit-for-bit replica data copies of the source data file. In a manner similar to that as described above for snapshots of a file, a snapshot may be made with respect to a file system. An embodiment in accordance with techniques herein may use any suitable technology to create the desired file and/or file system snapshots. For example, an embodiment may use techniques as described in U.S. Pat. No. 8,032,498, Issued Oct. 4, 2011, DELEGATED REFERENCE COUNT BASED FILE VERSIONING, Armangau et al., which is incorporated by reference herein.

What will now be described is how to create a snapshot of a file such as file ABC.DB as may be stored in a distributed file system having the file's metadata stored in an MDFS separate from the file's content data as may be stored separately in one or more DSFSs. In one embodiment, the snapshot of a file may have a naming convention. For example, the snapshot for file ABC.DB may be have a name of ABC.DB', or ABC.DB_snap or another naming convention. In connection with techniques herein, snapshot processing to obtain a snapshot of a file ABC.DB may be performed which includes quiescing data operations to the file, creating a snapshot of the file's metadata data, creating a snapshot of the file's content data, and unquiescing data operations directed to the file. Additionally, as described below in more detail, the snapshot processing steps may be logged.

Quiescing operations which respect to a file in the distributed file system may be characterized as pausing or altering the processing state of client requests (e.g. data operations such as read and write data, and read and write metadata) particularly those that might modify information (e.g., data and/or metadata) of the file in order to guarantee a consistent and usable file for which a snapshot is created. This quiescing generally includes temporarily holding or suspending commencement of any new I/Os or other operations that may modify the file data or file metadata (e.g., also referred elsewhere herein as freezing the metadata and freezing the file data), completing pending I/Os or operations directed to the file (data and metadata), and flushing any file data or metadata that may be cached to the physical storage device. Quiescing may include preventing new operations from being started and allowing all active/in-progress/pending operations to complete or otherwise back out such pending operations. As described above, data operations received subsequent to commencement of quiescing may be held or suspended. Rather than hold or suspend such operations such as by buffering the data operations in a queue or other structure during quiescing, an embodiment may return a Delay message/error thereby causing the client to retry the operation at a later point. It should be noted that such delay messages may be returned to the client rather than holding the operation for the duration of quiescing in order to avoid possibly causing the waiting client to timeout. An embodiment may issue delay messages for all newly received data operations or may selectively issue delay messages for some operations and/or for some clients. For example, there may be particular data operations which are expected to take (e.g. on average based on a heuristic or general knowledge) above a threshold amount of time whereby this amount of time coupled with the expected amount of time the data operation will be held or suspended would otherwise cause a client to timeout. In this case, a delay message may be returned to the client issuing the data operation rather than buffer the data operation in a holding or suspended state as part of quiescing.

Thus, an embodiment in accordance with techniques herein may provide for creating a consistent point in time copy that is a consistent snapshot of the requested file in the distributed file system. The processing for creating the snapshot may be transactionally orchestrated so that a distributed snapshot of the file is created in a consistent manner. If there is a failure during the process, the snapshot processing completed up to the point of failure may be undone using a log of recorded snapshot processing performed up to the point of failure. In one embodiment, the MDFS that hosts the file for which a snapshot is being created may drive (e.g., control or orchestrate) the snapshot processing for the file.

Figure 7A:
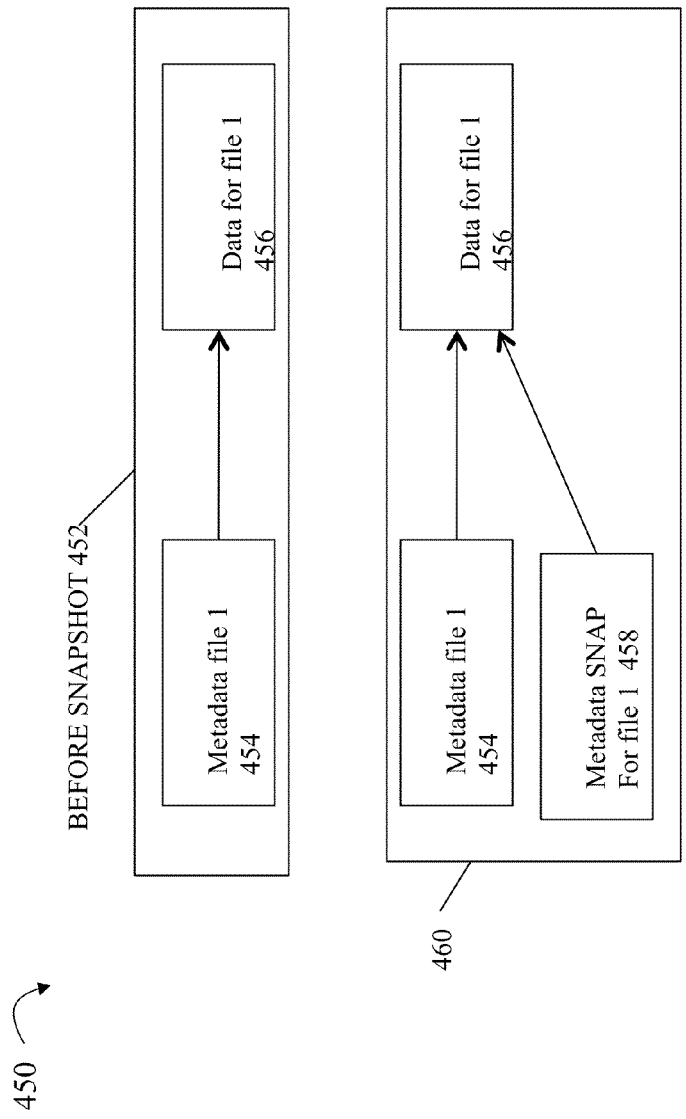
FIGS. 7A-7B illustrate steps in connection with creating a snapshot of a file in an embodiment in accordance with techniques herein.
Figure 7B:
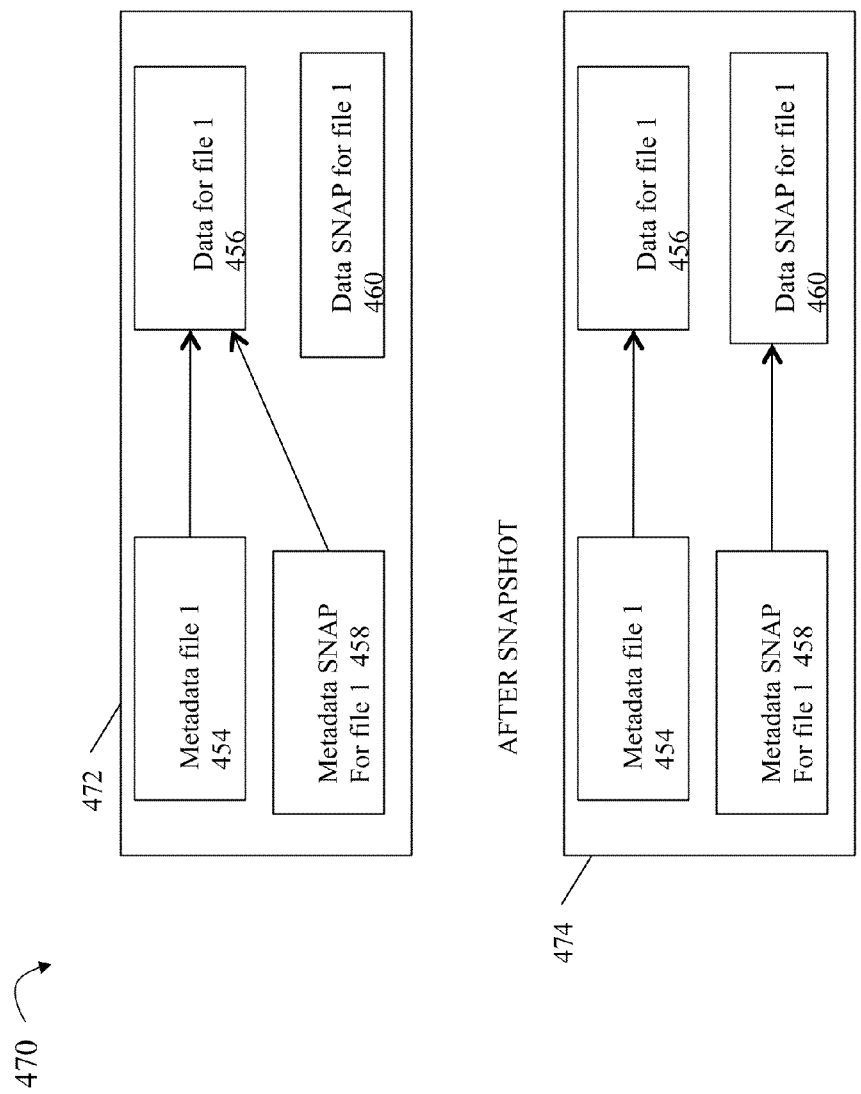

Once quescing has been completed for the file as described above, the snapshot of the metadata file for the ABC.DB may be created. With reference to FIGS. 7A-7B, shown are examples illustrating steps that may be performed as part of snapshot processing to obtain a snapshot of a file in a distributed file system as described herein where file metadata is stored in an MDFS and file content data are stored in one or more DSFSs. For simplification of illustrating techniques herein, the following assumes that there is a single MDFS and a single DSFS. Element 452 shows the file FILE1 for which a snapshot is to be created once quiescing has completed but prior to proceeding further. As in 452, the file's metadata 454 points to the file's data 456. As a next step, a snapshot of the metadata file for FILE1 may be created. Element 460 illustrates creation of the metadata snapshot (SNAP) 458. The snapshot 458 of the metadata 454 for FILE1 may be created as a file in the same directory as the metadata 454 based on some naming convention for an embodiment as described elsewhere herein. At this point, the metadata SNAP 458 may point to the data 456 of the file.

With reference to 472 of FIG. 7B, a snapshot 460 of the data 456 for the file may be created. The foregoing snapshot of the data 456 may be denoted as data SNAP 460. The data SNAP 460 may be created as file in the same directory as the data 456 based on some naming convention for an embodiment as described elsewhere herein. With reference to 474, the metadata SNAP 458 is now adjusted to point to the data SNAP 460.

Every metadata file for a file of the distributed file system has a journal or log which may be used to log the transactional processing steps for any transactional operations performed with respect to a file. In connection with techniques herein, such a per metadata file log may be used to record and track processing steps performed in connection with creating a snapshot of a file associated with the per metadata file log. Thus, the per file log tracks processing steps for a transactional operation such as creating a snapshot of a file. Once the snapshot processing of the file has been successfully completed, the per file log for the snapshot processing may be cleared. Additionally, an embodiment may keep a global log which points to all such per file logs for pending or in-progress transactional operations.

Figure 8:
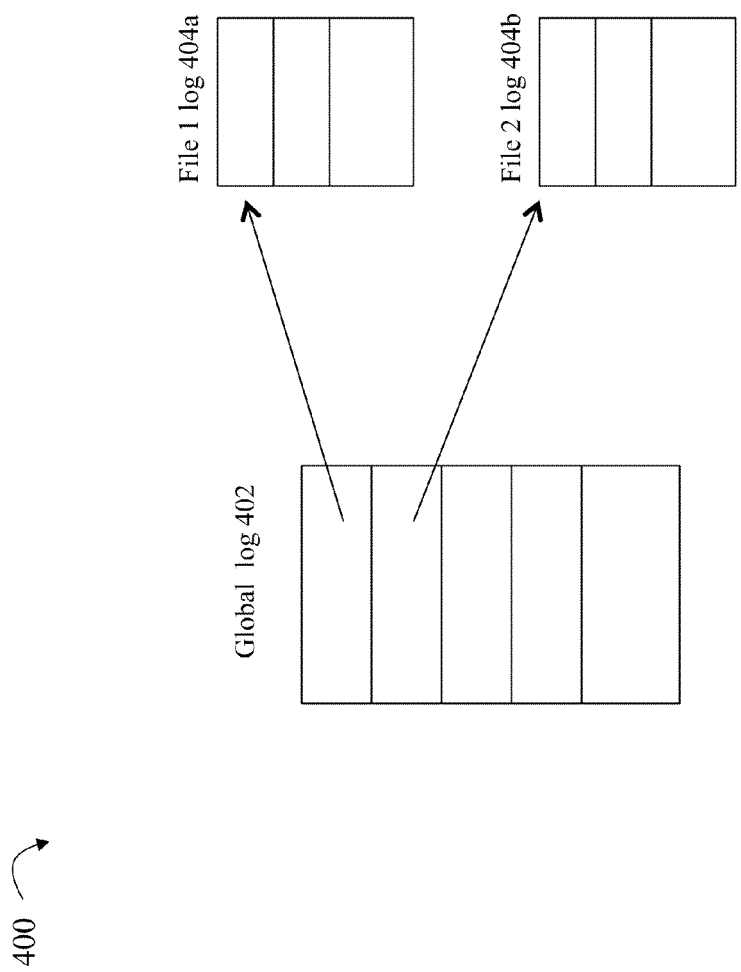
FIGS. 8 and 10C are examples of log files as may be used in an embodiment in accordance with techniques herein.

Referring to FIG. 8, shown is an example illustrating the above-mentioned per-file logs and global log as may be used in an embodiment in accordance with techniques herein. The example 400 includes the global log 402 which points to or identifies one or more per file logs 404a, 404b where each of 404a, 404b is uniquely associated with a different metadata file of the MDFS for a file which is having its snapshot obtained. Each per-file log 404a may log steps comprising the snapshot transactional operation to create a snapshot of the file associated with 404a. The per file log 404a may record steps, for example, including freezing the metadata (as a first step in the quescing), freezing each data portion of the file (as part of the quiescing), creating a snapshot of the metadata (as illustrated in connection with FIG. 7A), creating a snapshot of the file's data portion(s) (as illustrated in connection with FIG. 7B), and binding/assigning metadata for the snapshot to the snapshot of the file's data portion(s) (as illustrated in connection with FIG. 7B).

As a transactional operation, the snapshot process comprising multiple processing steps may be either all performed successfully (thereby completing creation of the snapshot of the file), or not at all (as may be the case if one of the steps fails thereby requiring rolling back or undoing all steps of the snapshot operation performed as recorded in the file's log). The per file log as illustrated in FIG. 8 may be used as an UNDO log used to UNDO the snapshot processing operations performed upon a failure of one of the snapshot processing steps. Thus, the entire snapshot transactional operation is either complete or undone if there is a failure at any point in the steps of the operation. For example, suppose the embodiment stores the file's data in three DSFSs and a snapshot is successfully create for data portions in 2 of the 3 DSFSs. However, there is failure in connection with an attempt to create a snapshot of the $3^{rd}$ data portion of the file on the 3rd DSFS because, for example, a server hosting the $3^{rd}$ DSFS is unavailable, a link/connection to the server hosting the 3rd DSFS is down, and the like. In this case upon failure, all previously performed steps for the snapshot processing as recorded in the log are undone.

As an example providing further detail in connection with a file FILE1 having its metadata (META1) stored in an MDFS and its file content data stored in 3 portions (DATA1, DATA2, DATA 3) respectively in 3 different DSFSs, the following may be information included in the per-file log for creating a snapshot of FILE1. In the following, freeze refers to the process of suspending starting any new operations that modify the particular metadata or data portion of the file content as part of quiescing, snap refers to obtaining a snapshot of the particular metadata or data portion of the file content, and thaw may be the complementary process of freeze (as performed as part of unquiescing) whereby new operations to the particular metadata or data portion are allowed to now commence. The log may include information tracking the following processing steps:

1. freeze META1
2. freeze DATA1
3. freeze DATA2
4. freeze DATA 3
5. snap DATA1
6. snap DATA2
7. snap DATA3
8. snap META1
9. update metadata snap to point to snap data
10. thaw metadata and data files
11. clear log Steps 1-4 above are the first steps of quiescing for the file being snapshot where new operations are suspended. After completion of freeze steps 1-4, there is an implicit wait for the pending operations to drain and then flushing of any cached data or metadata for the file. Steps 1-4 may be performed in parallel or serially. Then steps 5-8 may be performed to create desired snapshot of metadata and data portions of the file. Steps 5-8 may be performed in any order if performed serially, and may otherwise be performed in parallel. Step 9 includes updating the metadata to point to the snapshot data portions created rather than the original data. Step 10 is thawing the metadata and data files previously frozen in steps 1-4 Thawing may include first thawing the metadata followed by thawing each of the data portions (whereby thawing of all the data portions may be done in parallel). An embodiment may record thawing of the metadata and data portions as an aggregate collective step via the single line 10 in the log. Once processing is completed, the log including the above-mentioned steps may be cleared. Additionally, once the snapshot of the file is complete (e.g., snapshot of the files's data and metadata), the snapshot of the file may be included as an element in the client's consolidated view (e.g., such as presented in connection with FIG. 5).

It should be noted that an embodiment may record a step in the log after such processing for the step has been completed. An embodiment may also utilize different semantics in connection with a log file. For example, with respect to each above-noted processing step of a log, an embodiment may record two operations in the log indicating starting and completing each such step. For example, in the above-mentioned logged steps, the step 5 of "snap DATA1" may include records indicating "start snap DATA1" and "complete snap DATA1" rather than the single above-mentioned step.

It should be noted that an embodiment in accordance with techniques herein may perform quiescing which suspends or freezes all operations in connection with a file being snapshot. As a variation, an embodiment may perform quiescing which suspends or freezes those operations in connection with a file being snapshot which modify the file data and/or the file metadata thereby allowing specific operations which may be characterized as non-modifying (e.g., read only) with respect to the file data and its file metadata. Thus, the quiescing may selectively freeze or suspend modifying operations with respect to the file data and file metadata. The following are some examples of non-modifying requests that may be allowed during quiescing: READ (read from a file), GETATTR (read file attribute information), LOOKUP (e.g., described elsewhere herein to lookup a file name and return information about the file such as a file handle), READDIR (read directory information), READLINK (read a symbolic link), LOCK, UNLOCK, OPEN (for cases which cannot create or truncate a file), and CLOSE. The following are some example of modifying requests: WRITE (write to a file), SETATTR (set attributes of the file), CREATE, RENAME (rename directory entry such as a file), REMOVE (remove file system object), LINK (create a link to a file), SYMLINK (create symbolic link to a file), OPEN (cases which can truncate or create a file), and the like. It should be noted that the foregoing operations may vary with the particular protocols and are provided as non-limiting examples for illustrative purposes. It should also be noted that some requests characterized as non-modifying may however advance an access time attribute. Thus, the non-modifying requests may be characterized as non-modifying with respect to explicit modification of file data and file metadata. However, a non-modifying request may still indirectly result in modification of the access time attribute such as associated with a file. For example, a READ request to read file content data results in reading the requested file data and also indirectly results in updating the access time attribute indicating when the file was last accessed. In an embodiment allowing non-modifying requests during the snapshot processing whereby the non-modifying request may advance the access time of a file, file system, and/or directory (e.g., access time attribute of one or more objects or entities), an embodiment may cache (e.g., generally store persistently) additional information regarding access time attribute modifications made during the snapshot processing by such non-modifying requests. In such an embodiment, the modifications to the access time attributes are not made to the actual attribute information as may be recorded in metadata for files but such modifications may rather be recorded during the snapshot processing and then collectively applied to the original metadata and snapshot of the metadata data in an additional post-processing step prior to clearing the log. The post processing step may be performed prior to step 11 in the above-mentioned log which includes collectively incorporating such changes to the access time attributes into the snapshot and original metadata for the file being snapshot. Such a post processing step may be logged in a manner similar to other snapshot operation steps as described herein.

Figure 9:
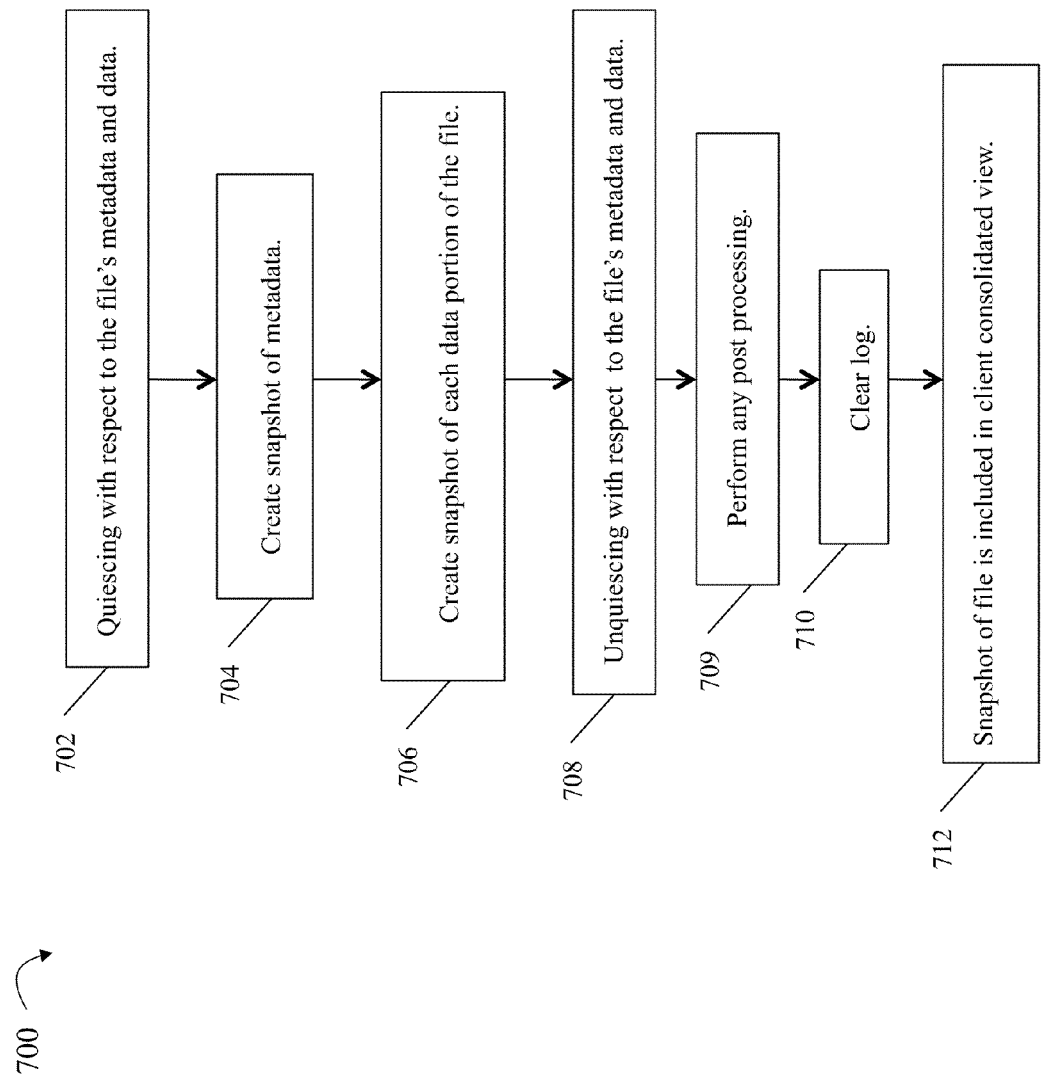
FIGS. 9, 9B, 10D and 10E are flowcharts of processing steps that may be performed in an embodiment in accordance with techniques herein.

Referring to FIG. 9, shown is a flowchart of processing steps as may be performed in an embodiment in connection with techniques herein for creating a snapshot of a file. The steps of 700 summarize processing described above. At step 702, quiescing is performed with respect to the metadata and data for the file being snapshot. In step 704, a snapshot of the file's metadata is created. In step 706, a snapshot of each of the file's data portion(s) is created. In step 708, unquiescing is performed with respect to the metadata and data for the file being snapshot.

In step 709, any post processing that may be included in an embodiment may be performed. As steps 702-709 are performed, information may be logged as described above. Once the snapshot processing steps have been successfully completed, the log for the snapshot processing of the file may be cleared in step 710. In step 712, the snapshot of the file may be included in the client's consolidated view (e.g., such as illustrated in FIG. 5).

It should be noted that a superblock describes core data for the file system. As known in the art, the superblock may, for example, be used to track free and allocated blocks of the file system and may also include other information describing the layout of the file system at high level. In one embodiment, the log information for the global file log and per file log such as illustrated in FIG. 8 may be stored as state information in the superblocks for the MDFS and DSFSs. For example, one or more bits may be used to represent the possible various states in connection with snapshot processing steps such as quiescing, creating a snapshot of metadata or file data, and the like. Values of such bits for updated as each snapshot processing step is commenced and then completed.

In addition to the log information described in connection with the global log and per file log (or more generally the snapshot processing state information as represented in the global log and per file log), each DSFS and each MDFS may also maintain its own individual state information in memory regarding its own state with respect to snapshot processing. For example, each DSFS may maintain information in memory indicating whether a data file of the DSFS is frozen in connection with snapshot processing to create a snapshot of the file, and each MDFS may maintain information in memory indicating whether metadata for a file included in the MDFS is frozen in connection with snapshot processing to create a snapshot of the file. Such information may be used, for example, in connection with recoverying from a failure such as part of ensuring or verifying a state of an MDFS, DSFS, or file thereof.

In connection with performing steps of the snapshot operation, failures may occur during the snapshot operation itself and failures may also occur during the rollback/undo processing of the snapshot operation. As described herein, the snapshot operation is an atomic transactional operation governed by an "all or nothing" rule whereby all steps of the snapshot operation processing are performed or none. Thus, the snapshot operation may be further characterized as being in accordance with the ACID (atomic, consistency, isolation, durability) property guaranteed using the foregoing log.

An embodiment may also perform as a transactional operation processing to delete a snapshot of a file in a manner similar to that as described herein for creating a snapshot of a file. A log file may be used to track steps performed in connection with deleting a snapshot of a file in a per file log as with creating snapshot of a file. For example, consider the snapshot created above for FILET having metadata META1 and file contents of 3 data portions denoted DATA1, DATA2 and DATA 3. The log for now deleting the snapshot of FILE 1 file may include information tracking the following processing steps:

1. delete snap DATA1
2. delete snap DATA2
3. delete snap DATA3
4. delete snap META1
5. clear log It should be noted that the processing steps logged omit any quiescing or freezing with respect to data and metadata for the file. In the embodiment described herein, such processing may be performed implicitly using other file system logic and code. In other words, other code modules than as described herein may perform processing to stop or block servicing any new I/Os for the file snapshot being deleted and delete any pending I/Os for the snapshot file being deleted. Additionally, it should be noted that an embodiment may perform steps 1-4 of the above-mentioned log sequentially in any order, or in parallel. As a result of deleting the snapshot of the file is complete (e.g., snapshot of the files's data and metadata), the snapshot of the file is removed from the client's consolidated view. It should be noted that an embodiment may delete the file from the client's consolidated view prior to commencing the above-mentioned processing steps as recorded in the log.

Figure 9B:
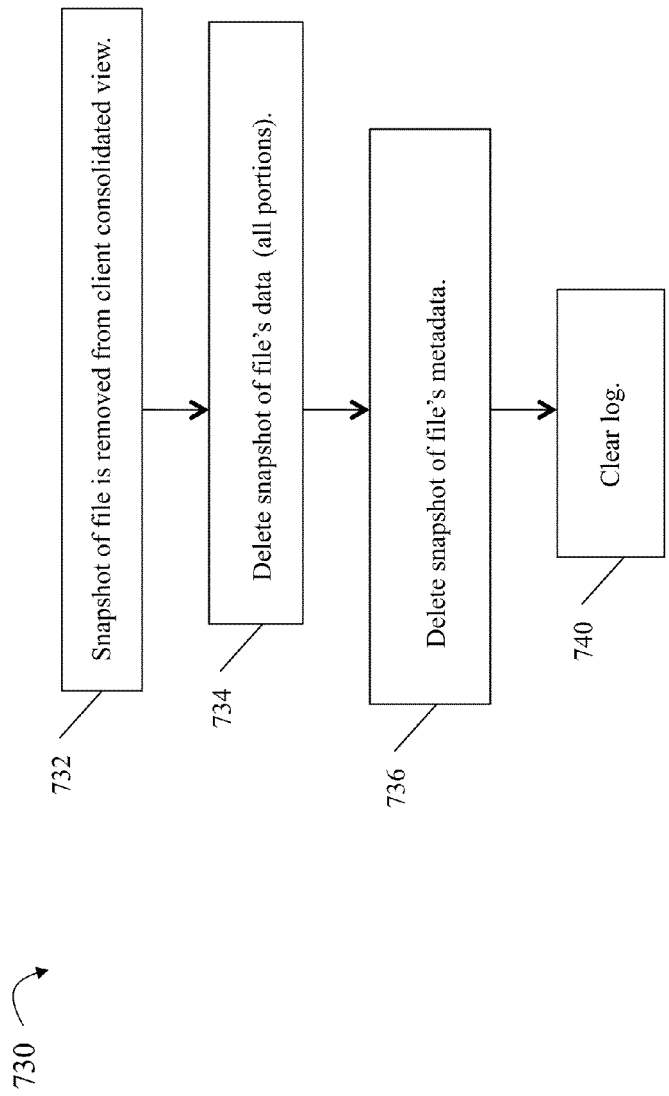

Referring to FIG. 9B, shown is a flowchart of processing steps that may be performed in an embodiment in connection with deleting a snapshot of a file. The steps of the flowchart 730 summarize processing described above. At step 732, the snapshot of the file is deleted from the client's consolidated view. At step 734, the snapshot of the file's data contents is deleted. Step 734 may include deleting the snapshots of all data portions of the file from one or more DSFSs where such snapshot data portions are located. At step 736, the snapshot of the file's metadata is deleted. At step 740, the log tracking the deletion processing of the flowchart 730 is cleared thereby indicating that the delete file snapshot processing is no longer in progress.

What will now be described are some of the failure cases that may occur in connection with a snapshot operation such as for taking a snapshot of a file.

As a first failure case, the MDFS coordinating the snapshot operation may crash or become unavailable. Once the failure of the MDFS is detected, other software may perform processing which thaws all MDFS and/or DSFSs that may have been frozen when the coordinating MDFS fails. At this point, the snapshot operation processing may be in an inconsistent state and cleanup for undoing the snapshot operation may be done upon reboot/restart of the coordinating MDFS. Once the coordinating MDFS restarts, it may perform processing including:

1. ensuring that all affected files and file systems (e.g., MDFSs and DSFSs) are really thawed/not frozen with respect to operations for this file. If any are frozen, such file systems are thawed. In other words, the affected file systems which are frozen by quiescing would normally thaw themselves upon MDFS failure. However, MDFS performs an additional check upon recovery from a failure to ensure that the affected file systems have been thawed.

2. traversing the per file log to clean up and undo any steps of the snapshot operation successfully completed prior to the failure (where such steps are recorded in the log). Step 2 may include deleting any existing snapshots of data and metadata as indicated in the log and clearing the log. The per file log may be used to determine what snapshots, if any, need to be deleted.

3. The MDFS may then attempt to redo/restart processing for the snapshot operation from the beginning.

As another failure case, consider one of the DSFSs being unavailable. For example, in connection with performing processing for the snapshot operation, the MDFS may have issued command to a DSFS to create the data snapshot and the DSFS may not have returned an acknowledgement regarding successfully completion prior to a timeout period expiring. An entry is not written to log file that the data snapshot has been created until such acknowledgement is received. For example, suppose DSFS has created the data snapshot but the link between DSFS and MDFS has failed prior to the DSFS sending the acknowledgement and the MDFS receiving such acknowledgement. Other reasons for the MDFS not receiving the acknowledgement are also possible (e.g., DSFS may have failed after creating the data snapshot but prior to sending the acknowledgment, DSFS may have failed before creating the data snapshot). The coordinating MDFS may perform processing to undo the snapshot operation by traversing the log as described above. However, a failure with respect to a DSFS may also occur when the MDFS is attempting to undo steps of the snapshot operation. For example, an attempt to delete one of the data snapshots previously created may fail as part of the undo processing. In this manner the step to delete the data snapshot may fail a first time as part of undo processing. An embodiment may then try the same undo step (to delete the data snap shot) a second time. Generally, the MDFS may retry such undo processing (e.g., to delete the data snapshot) a predetermined number of times. If undo processing fails to undo the particular step the predetermined number of times, the current undo processing with respect to the particular step may stop and continue with the next step in the log. The step of undo processing which failed (e.g., failed to delete the file data snapshot such as due to a failed link to the hosting DSFS) is then attempted by a background scrubber process. The background scrubber process may examine the log files as part of a background process and perform the previously failed undo processing step until successful.

Aspects of the above-mentioned processing performed upon a failure during the atomic or transactional processing to create a snapshot of a file may also apply with respect to a failure in the transactional processing to delete a snapshot of a file. For example, the MDFS including the snapshot file's metadata may coordinate the deletion processing. If the coordinating MDFS fails, the coordinating MDFS may continue processing with the failed step denoted in the log file. The operation to delete the file may be considered complete when all steps described above by the log have been completed.

What will be described are techniques that may be performed in connection with creating a snapshot of a file system within the distributed file system. With reference back to FIG. 5, the file system of which a snapshot is obtained may be, for example, a subtree of the consolidated view or hierarchy. For example, a client or other facility may request that a snapshot be taken of file system 1 254a whereby creating a snapshot of the file system 1 results in creating a point in time copy of node 254a and also its descendant nodes (e.g., 256a-b and 260).

Figure 10A:
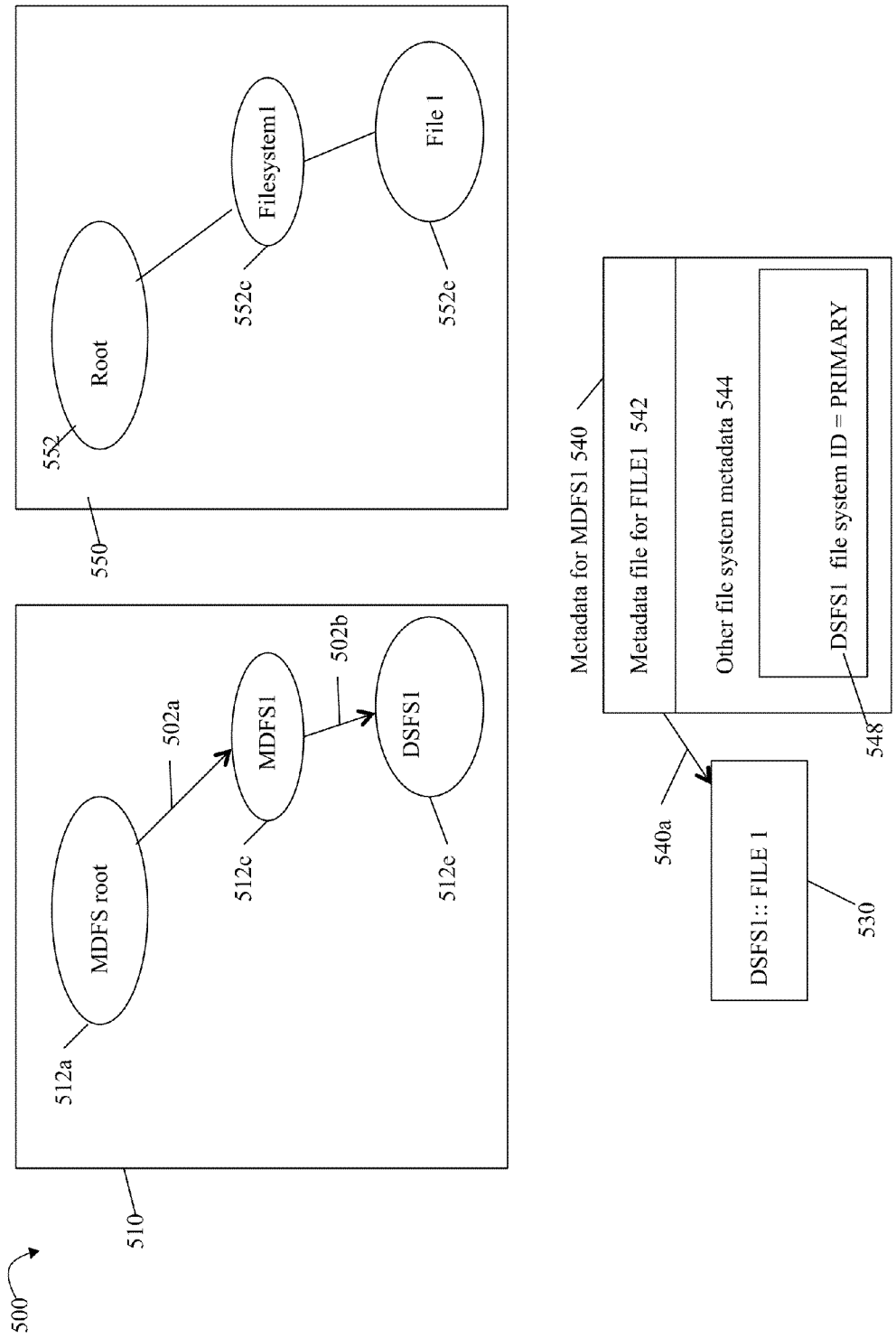
FIGS. 10A and 10B illustrate an example in connection with taking a snapshot of a file system in an embodiment in accordance with techniques herein.
Figure 10B:
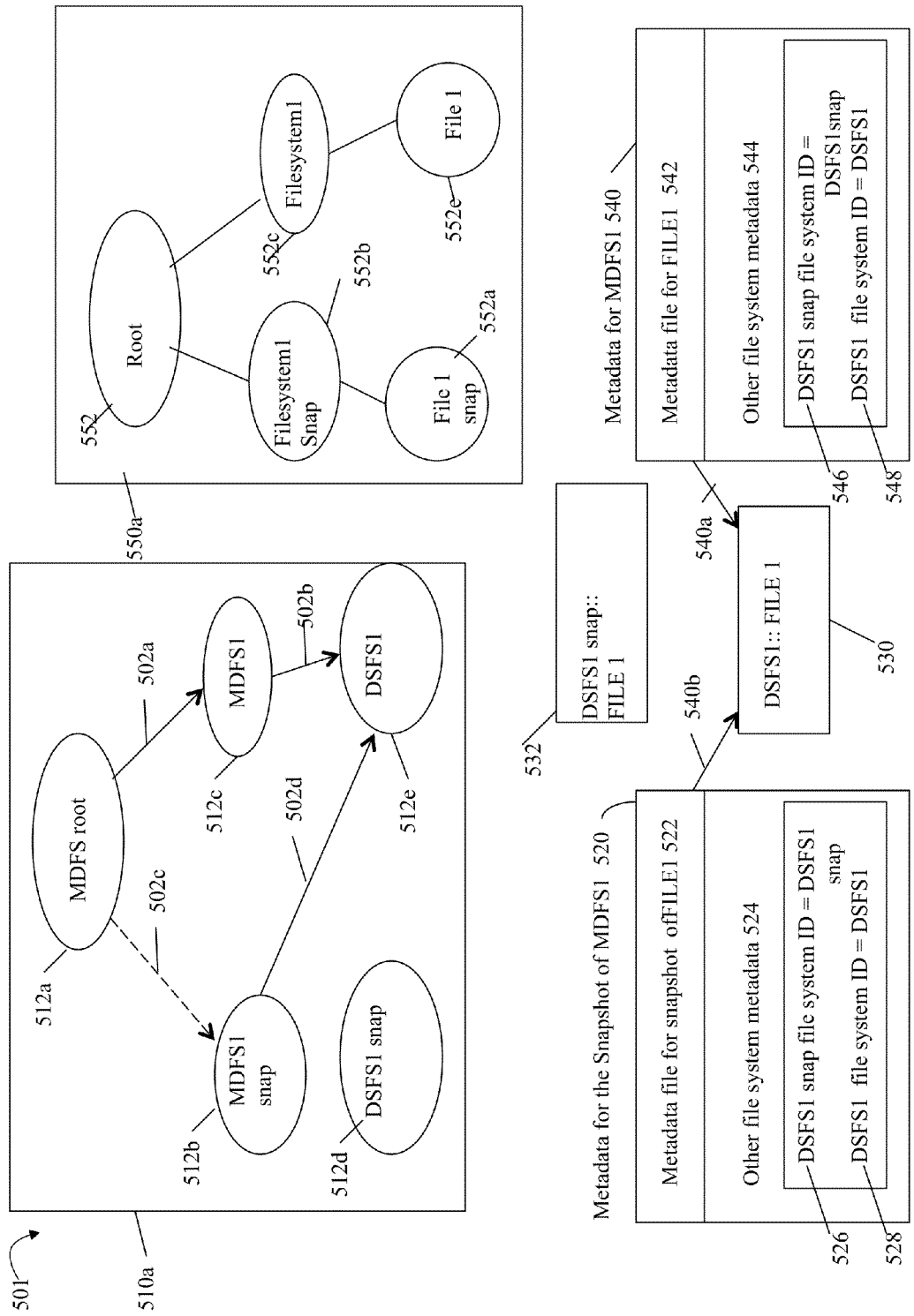

With reference to FIGS. 10A and 10B, shown is an example illustrating use of techniques herein with obtaining a snapshot of a file system. FIG. 10A is a representation of the state prior to commencing snapshot processing. Element 550 may represent the consolidated logical view presented to a client consistent with other discussion herein such as in connection with FIG. 5. The example 550 includes a root 552 and a single file system FILESYSTEM1 represented by node 552c. In the FILESYSTEM1, there is a single data file FILE1 denoted by node 552e. A file system snapshot may be requested with respect to FILESYSTEM 1 represented by node 552c. Element 510 may represent a mapping of the single file system 522c for which snapshot processing is to be performed whereby the FILESYSTEM1 (node 552c) has MDFS1 represented by node 512c as its MDFS. For files included in FILESYSTEM1, each such file has a metadata file included in MDFS1 (node 512c) and has its data stored in a single DSFS, DSFS1 represented by node 512e. In this simple example, assume that MDFS1 includes only a single file FILE1. Prior to the snapshot operation processing commencing, the hierarchy of 510 may include nodes 512a, 512 and 512e and connections 502a-b denoted therebetween. It should be noted that the metadata for the root node may be stored in an MDFS separate from MDFS1 used for FILESYSTEM1 (node 552c).

Element 540 may represent the metadata for MDFS1 which may include a metadata file for FILE1 denoted by 542 and other file system metadata 544. Element 542 represents the metadata file for FILE1 as stored in MDFS1 that points 540a to the data file for FILE1 included in DSFS1. The other file system metadata 544 may include the file system identifier 548 for DSFS1.

The processing to take a snapshot of a file system is similar to that as described herein for taking a snapshot of a file. In this case, the snapshot of filesystem 1 552c includes quiescing MDFS1, quiescing DSFS1, taking a snapshot of the underlying MDFS1 and DSFS1 as included in filesystem 1, unquiescing MDFS1, and unquiescing DSFS1 and DSFS1. Additionally, snapshot processing includes logging such steps as each step is completed. This is described in more detail in following paragraphs. Before describing this in more detail, reference is made first to FIG. 10B which illustrates how the snapshot of the file system1 is included in the consolidated logical view presented to the user and also how the snapshot of the file system may be mapped onto MDFS and DSFS elements in an embodiment after the snapshot operation has completed.

With reference now to FIG. 10B, element 550a represents an updated version of 550 from FIG. 10A identifying where the file system 1 snapshot is included in the hierarchy. Element 552b represents the snapshot created for file system 1 (denoted filesystem1 snap) connected to the logical consolidated view of the namespace as presented to the client. Element 552a represents the snapshot created for FILE1 (denoted FILE1 snap) connected to the logical consolidated view of the namespace as presented the client.

Element 510a represents an updated version of 510 from FIG. 10A. In comparison to element 510, element 510a includes new nodes 512b, 512d and new connections 502c, 502d whereby the foregoing new nodes and new connections represent the mapping of nodes 552b and 552a as included in the hierarchy 550a onto underlying MDFSs and DSFSs of the distributed file system. In this example, the snapshot of MDFS1 (MDFS1 snap) may be created as a new MDFS on the same server as MDFS1. Similarly, the snapshot of DSFS1 (DSFS1 snap) may be created as a new DSFS on the same server as DSFS1.

A junction may be used to connect or link file system namespaces. For example, with reference to element 550a, a junction may be used to link the namespace of 552c to 552 and a junction may similarly be used to link 552b (for file system1's snapshot) to 552. Thus, a junction may be used to link root 552 to 552b in a manner similar to the way in which the root 552 is connected to the namespace of the original file system 552c being snapshot. Generally, a junction may be defined as a filesystem object used to link a directory name in a current fileset (such as node 512a) with an object within another fileset (such as node 512b). In other words, the junction may be a server-side "link" from a leaf node in one fileset to the root of another fileset. A "fileset" is the abstract view of a filesystem in a uniform namespace, and may be implemented behind that abstraction by one or more physical filesystems at any given time. Each fileset has a name called an "FSN" (fileset name), and each physical filesystem has a fileset location ("FSL"). A fileset is a directory tree containing files and directories, and it may also contain references to other filesets. These references are called "junctions". To provide location independence, a junction does not contain information about the location of the real resource(s), but instead contains an FSN that can be used to look up the location information. The service that can be used to map from the FSN to the FSL(s) is called a namespace database (NSDB) service. The NSDB provides a level of indirection from the virtual paths in the uniform namespace to the actual locations of files. By design, the NSDB does not store the junctions. This allows junction administration and NSDB administration to be separate roles. Junctions and other functionality that may be used in an embodiment in accordance with techniques herein are known in the art such as described, for example, in RFC 5716, "Requirements for Federated File Systems", January 2010.

A junction may be used as described above in connection with linking the snapshot of MDFS1 (MDFS1 snap) to the consolidated view thereby making the snapshot of filsystem1 accessible to the user in the consolidated client view of 550a. Similarly, in an embodiment where DSFSs are independent physical file systems, DSFS1 512e and DSFS1 snap 512d (snapshot of filesystem1's data contents, DSFS1) may be mounted.

In connection with element 510a, it should be noted that MDFS1 snap 512b points to the original copy of DSFS1 512e thereby omitting the assignment/binding of MDFS1 snap 512b to DSFS1 snap 512d as part of the snapshot processing. This is further illustrated by element 520 which represents the metadata for the snapshot of MDFS1 520. Element 520 may represent the metadata for the snapshot of MDFS1 which may include a metadata file for the snapshot of FILE1 denoted by 522 and other file system metadata 524. Element 522 represents the metadata file for the snapshot of FILET as stored in MDFS1 snap that points 540b to 530 representing the original FILE1 data as included in DSFS1. Recall that when taking a snapshot for a single file, the snapshot of the file's metadata was updated to point to the snapshot of the files data. However, in connection with a file system snapshot that may contain hundreds and thousands of files, it is impractical and not scalable to reassign each file's metadata snapshot (e.g., as included in MDFS1 snap) to the new snapshot copy of the file data (e.g., as included in DSFS1 snap). Thus, snapshot processing for a file system may omit the equivalent of the step 9 as included in the per file log noted above (e.g., update metadata snapshot to point to data snapshot) when taking a snapshot of a file system. In other words, we do not update each individual file's metadata snapshot to point to file data snapshot. Rather, when snapshot processing is completed, each file's metadata snapshot is left pointing to the original file data as illustrated in FIG. 10B.

Additionally, note that stored in the file system metadata for the snapshot of MDFS1 520 is other file system metadata 524. Element 524 may include the file system identifier 526 for DSFS1 and may also include the file system identifier 528 for the snapshot of DSFS1. Similarly, element 544 may be updated to also include the file system identifier 548 for the snapshot of DSFS1. Thus, elements 548 and 528 may contain the file system identifier for DSFS1 and elements 546 and 526 may contain the file system identifier for the snapshot of DSFS1 after snapshot processing for the file system1 is completed.

Using the file system identifier of 526, processing may be performed to service client requests for a snapshot file or its metadata as included in the snapshot of file system 1 (e.g., as included in MDFS1 snap and DSFS1 snap) in order to provide a client with correct layout information for a snapshot file included in file system 1. In other words, as illustrated, the metadata file 522 for the snapshot of FILE 1 points to the original primary FILE1 data 530 rather the snapshot of FILET data (FILE1 snap) 532. In this case, when the client requests layout information for FILE1, processing may be performed "on the fly" to modify FILE1's metadata snapshot information 522 which points to 530. The modification may include modifying a portion of the path name for FILE1's data to reference DSFS1snap 512*d* rather than DSFS1 512*e* (e.g., modify the path name to use the file system identifier for DSFS1 snap 526 rather than DSFS1 528). To further illustrate, a fully qualified path name (or more generally any other globally unique identifier for an associated data file) may be formed as part of processing performed by MDFS in order to determine a file handle returned in response to the client request for the layout information for the snapshot of FILE1 532 by:

1. Retrieving the snapshot of FILE 1's metadata 522 which includes a fully qualified path name to the original primary FILE1 data 530. For example, the fully qualified path name to FILE1's data as represented by 530 may be SERVER1:\\DSFS1\FILE1. Thus, the fully qualified path name includes a portion denoting the DSFS thereby indicating that the file system IDs 526, 528 may be used to determine or map to a portion of the fully qualified path name for a file based on a file naming convention that may be utilized in an embodiment.

2. The fully qualified path name obtained from step 1 for the original primary FILE1 data 530 is modified by replacing the portion thereof corresponding to file system ID for DSFS1 (e.g., as represented by 528) with a new data portion corresponding to the file system ID for the snapshot DSFS1 (e.g., as represented by 526). For example, the fully qualified path name to FILE1's data as represented by 530 may be SERVER1:\\DSFS1\FILE1 whereby portion "DSFS1" corresponding to the file system ID 528 for DSFS1 is replaced with a new portion "DSFS1snap" corresponding to the file system ID 526 for the snapshot of filesystem 1. Thus, the updated fully qualified path name now includes the new portion denoting the "DSFS1snap" thereby pointing to the FILE1 data 540 included in the file system DSFS1snap (the snapshot of DSFS1) rather than the original file system DSFS1 including the original FILE data 530. Note that the foregoing assumes that the file name for the file content data FILE1 has the same name in DSFS1 and also the snapshot of DSFS1. In an embodiment in which the file name of the file content is different in DSFS1 snap than in DSFS1, then further processing may be performed to also accordingly modify the filename based on some suitable naming convention as may be used in an embodiment.

3. The file handle for the newly modified fully qualified path name from step 2 may be determined and returned to the client.

In a similar manner, an embodiment may perform such on the fly processing as needed to obtain a modified fully qualified name referencing a data file in the file system's snapshot file system (DSFS snap) rather than the data file in the original file system DSFS for other operations or otherwise similarly modify information returned to the client (e.g., such as in connection with a file handle which may be modified to use the file system ID of 526 rather than 528 for other requests such as lookup).

Such on the fly processing may be performed in connection with client requests which do not modify the layout information, or more generally, are non-modifying (e.g. do not modify the file data and/or metadata but rather only require reading such information). As a result of the on the fly processing for client operations which read the layout information and other file metadata, an embodiment may choose to still leave the metadata file 522 "as is" pointing to 530. However, if the client performs an operation or request to modify (write to) the snapshot of FILE1's data (e.g. as in DSFS1 snap) or otherwise modify the snapshot of FILE1's metadata in 522 (e.g., as in MDFS1snap), then processing may be performed to update FILE1's metadata opportunistically to also point to 532 rather than 530. In other words, the snapshot of FILE1's metadata 522 may be updated to point to 532 rather than 530 if there is an update to the snapshot of FILE1's data or the snapshot of FILE1's metadata.

As described elsewhere herein, the fully qualified path name is one example of a globally unique identifier that may be stored, for example, in a metadata file or included in layout information used by the MDFS and/or DSFS. As described above, an embodiment which stores layout information using fully qualified path names may perform the above-mentioned "on the fly" processing (e.g., such as for requests to read layout information without updating stored metadata information of the MDFS) or perform the above-mentioned opportunistic update processing (e.g., such as for requests which modify the layout or metadata information to update stored metadata) whereby such processing includes modifying a portion of the fully qualified path name to reference a file system for the snapshot of DSFS1 rather than the file system DSFS1 (e.g., data files for the original file system). In a similar manner, an embodiment using a globally unique identifier other than a fully qualified path name may also perform processing similar to that as mentioned above in connection with appropriately modifying a portion of the globally unique identifier to reference a file system for the snapshot of DSFS1 rather than the file system DSFS1 (e.g., data files for the original file system).

Figure 10C:
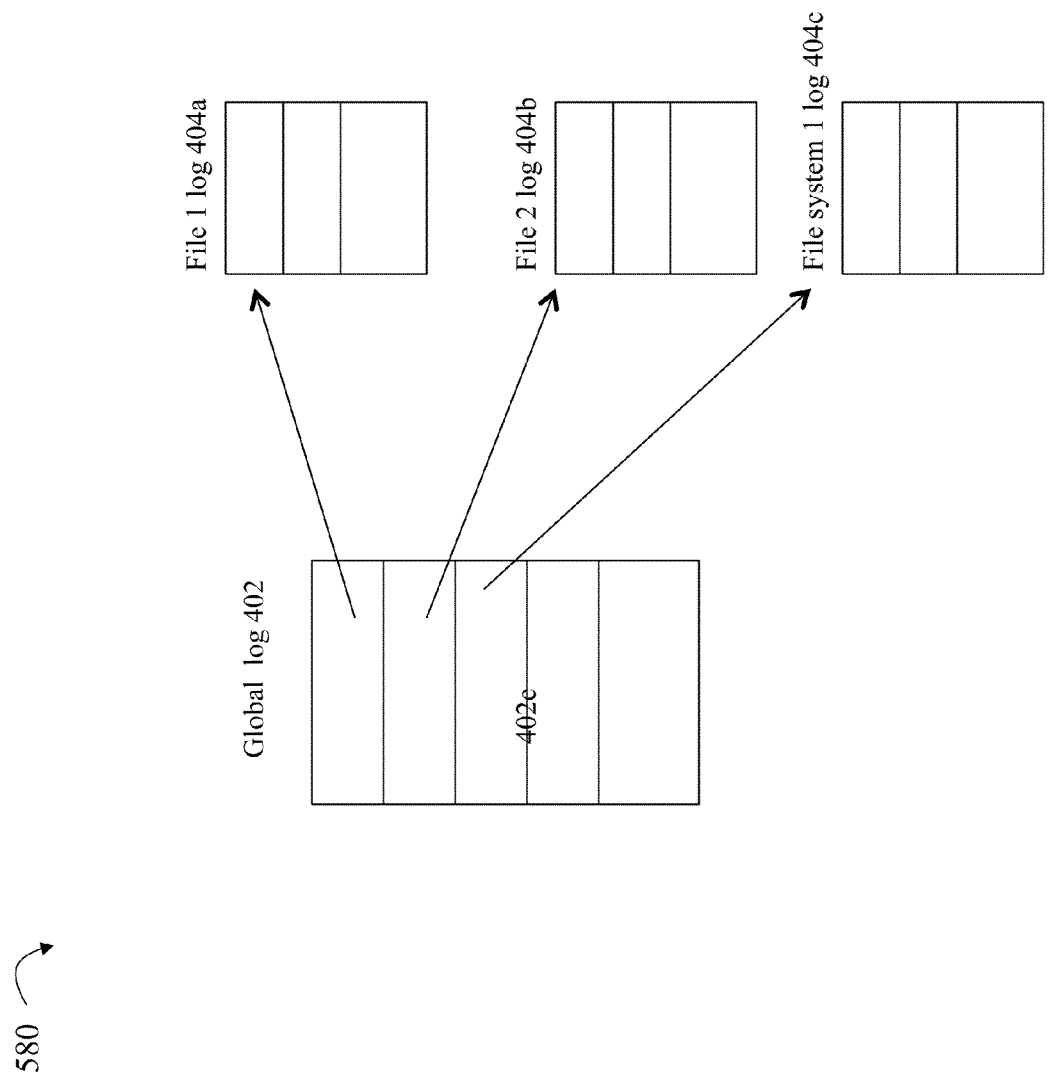

In a manner similar to that as described herein for snapshot processing of a file, snapshot operation processing steps may be logged for creating a snapshot of a file system. A log file may be kept per file system where processing for creating a snapshot of the file system is in progress. With reference to FIG. 10C, shown is a revised version of FIG. 8 to additionally include file system log 404*c* which is identified by an entry 402*c* of the global log 402. To further illustrate, consider the above-noted example for creating a snapshot of file system1 having its metadata stored in MDFS1 and its data stored in DSFS1. The file system level snapshot log may track processing steps represented as:

1. freeze metadata MDFS1
2. freeze data DSFS1
3. snap DSFS1
4. snap meta data MDFS1
5. thaw MDFS1 and DSFS1
6. clear log.

It should be noted that other aspects of taking a snapshot of a file are similar in connection with taking a snapshot of a file system. For example, the cases for failure described herein in connection with creating a snapshot of a file are the same as for creating a snapshot of the file system with the difference that the snapshot processing is with respect to a file system rather than a file. Furthermore the file system snapshot processing may be controlled by the MDFS of the file system for which a snapshot is being created.

In addition to the log information described in connection with the global log, per file log and per file system log (or more generally the snapshot processing state information as represented in the global log, file system log, and per file log), each DSFS and each MDFS may also maintain its own individual state information in memory regarding its own state with respect to snapshot processing. For example, each DSFS may maintain information in memory indicating whether the DSFS is frozen in connection with snapshot processing to create a snapshot of a file system, and each MDFS may maintain information in memory indicating whether the MDFS is frozen in connection with snapshot processing to create a snapshot of a file system. Such information may be used, for example, in connection with recovering from a failure such as part of ensuring or verifying a state of an MDFS, DSFS, or file thereof.

Additionally, in connection with processing for creating a snapshot of a file and a file system, it should be noted that the log file itself may become corrupted. In this case, a background scrubber process may also perform processing to clean-up any snapshot files or file system(s) which are partially created or otherwise clean-up (e.g., deleted) any files or file system(s) which may be characterized as "orphaned". For example, the log file tracking steps performed in connection with taking a snapshot of a file system may become corrupted. Information identifying the location of the snapshot file system may be stored in metadata for the original file system or otherwise created in a known location based on the original file system's location. If the log file (or more generally state information) describing processing steps performed up to a current point in time when creating the file system snapshot is corrupted, the background scrubber process may use such identifying information to locate the failed file system snapshot and perform the cleanup even without a log. Additionally, once the snapshot of the file system1 is complete (e.g., snapshot of the files system1's data and metadata), the snapshot of the file system may be included as an element in the client's consolidated view as described elsewhere herein.

As described elsewhere herein in connection with taking a snapshot of a file, an embodiment may implement variations of quiescing. An embodiment in accordance with techniques herein may perform quiescing which suspends or freezes all operations in connection with a file system being snapshot. As a variation, an embodiment may perform quiescing which suspends or freezes those operations in connection with a file system being snapshot which modify any file data, and/or modify any metadata associated with the file system (e.g., modify metadata for an individual file, directory, file system, and the like). In a manner similar to that as described above with respect to a file, specific operations which may be characterized as non-modifying (e.g., read only) with respect to the file system metadata and data may be allowed during the quiescing. Thus, the quiescing may selectively freeze or suspend modifying operations with respect to the file system and allow non-modifying operations with respect to the file system. Furthermore, in a manner similar to that as described above, modifications with respect to access time attributes (e.g., for files, file systems, directories) may be cached during the snapshot processing and then actually applied to the original and snapshot file system as a post processing step prior to clearing the log. Such a post processing step may be logged in a manner similar to other snapshot operation steps as described herein.

It should be noted that an embodiment may employ different rules or policies regarding what data operations are allowed (e.g., serviced) thereby not suspended or blocked during quiescing with respect to snapshot processing for a file and snapshot processing for a file system. For example, an embodiment may have a policy that 1) allows non-modifying operations during quiescing when taking a snapshot of all file systems or a selected set of all file systems and 2) blocks all operations (both modifying and non-modifying) during quiescing when taking a snapshot for any single file. The foregoing is merely one example illustrating how an embodiment may vary implementing such a policy for data operations blocked or suspended as part of quiescing. More generally, it should be noted that although reference may be made herein to aspects of snapshot processing for a file as being similar to those of snapshot processing for a file system, an embodiment may employ different policies and vary implementation with respect to each of snapshot processing for a file and for a file system.

In some embodiments, when a snapshot is created (for a file or a file system), the snapshot may be read-only by default although the snapshot may be created with other attribute information. Furthermore, once a snapshot (of a file or a file system) has been created which is read-only, such attribute information may be modified so that a snapshot of a file, snapshot of a file system or snapshot of some portion of a file system (e.g., such as a directory) is modifiable (e.g., not read-only).

An embodiment may also perform as a transactional operation processing to delete a snapshot of a file system in a manner consistent with description herein for deleting a snapshot of a file. A log file may be used to track steps performed in connection with deleting a snapshot of a file system in a per file system log as with creating a snapshot of a file system. For example, consider the snapshot created above for filesystem1 having its metadata snapshot in a MDFS denoted as "MDFS1 snap" and its file data snapshot in a single DSFS denoted as "DSFS1 snap". The log for now deleting the snapshot of file system 1 may include information tracking the following processing steps:

1. disconnecting DSFS1 snap from the consolidated view
2. disconnecting MDFS1 snap from the consolidated view
3. delete snap DSFS1
4. delete snap MDFS1
5. clear log In a manner similar to that as described above in connection with deleting a snapshot of a file, it should be noted that the processing steps logged omit any quiescing or freezing with respect to file system data and file system metadata for the snapshot being deleted. In the embodiment described herein, such processing may be performed implicitly using other file system logic and code. In other words, other code modules than as described herein may perform processing to stop or block servicing any new I/Os for the file system snapshot being deleted and delete any pending I/Os for the snapshot file system being deleted. Additionally, it should be noted that an embodiment may perform steps 1-2 of the above-mentioned log sequentially as denoted above, followed by steps 3-4 whereby steps 3-4 may be performed sequentially in any order or in parallel.

Described above in connection with snapshots of files and file systems, some aspects in connection with freeze semantics and associated processing as may be performed in an embodiment should be noted. An embodiment may perform processing to synchronize multiple sets of attribute information (and more generally with respect to metadata) as may stored in various components such as the different DSFSs and MDFSs of the system described herein. Such synchronization processing may be performed to resolve any inconsistencies with respect to attribute information, or more generally, with respect to metadata. For example, each DSFS may have its own copy of attribute information needed to process I/O requests. DSFSs may also have their own local copies of attributes that are changed by performing I/O requests whereby such attributes may include, for example, access time, modification time, size, and the like. In any case, such multiple sets of attribute information that may be stored locally on MDFSs and DSFSs may be synchronized as part of processing of a freeze operation when freezing metadata (e.g., when freezing the MDFS when creating a file system snapshot or when freezing a metadata file for a file being snapshot). The freeze operation processing may include flushing all such local copies of attribute information (and more generally with respect to metadata) as may be stored on the file servers and synchronizing such attribute information (and more generally with respect to metadata) to be consistent with the latest file content data. As a variation, an embodiment may perform such flushing and synchronization with respect to the multiple sets of attribute information (and more generally with respect to metadata) as part of a post processing step.

Additionally, in connection with processing performed for the freeze and thaw operations, or more generally, the quiescing and unquiescing steps, an embodiment may utilize locks and other underlying synchronization operations and primitives. For example, in one embodiment, freezing or quiescing operations with respect to an object or entity (e.g., with respect to a file or file system) may be a request for a lock granting exclusive access to the object or entity. The foregoing lock may be a synchronization operation of an embodiment which results in performing other aspects of quiescing such as draining pending I/O requests. The particular synchronization operations or primitives and associated functionality that may be used may vary with embodiment. Additionally, as noted elsewhere herein, an embodiment may use any suitable technique in connection with snapshot processing. For example, an embodiment may use the file system snapshot technology and protocol for creating a file system snapshot (e.g., such as in connection with freeze or quiesce, snap and thaw or unquiesce processing) as described in U.S. Pat. No. 7,035,881, "Organization of Read-Write Snapshot Copies in a Data Storage System", issued on Apr. 25, 2006, Tummala et al., and U.S. Pat. No. 6,934,822, "Organization of Multiple Snapshot Copies in a Data Storage System", issued on Aug. 23, 2005, Armangau et al., both of which are hereby incorporated by reference.

Figure 10D:
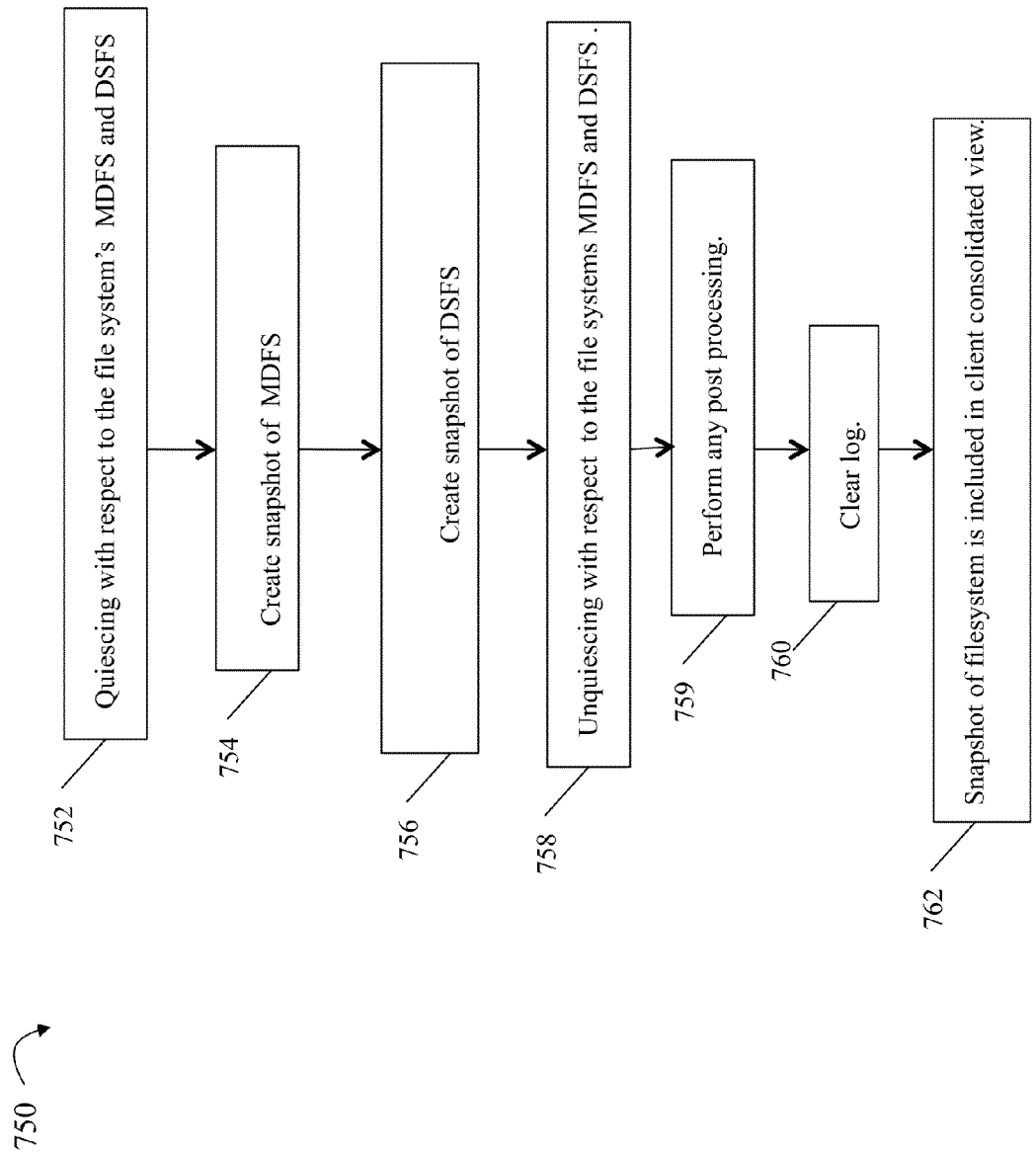
Figure 10E:
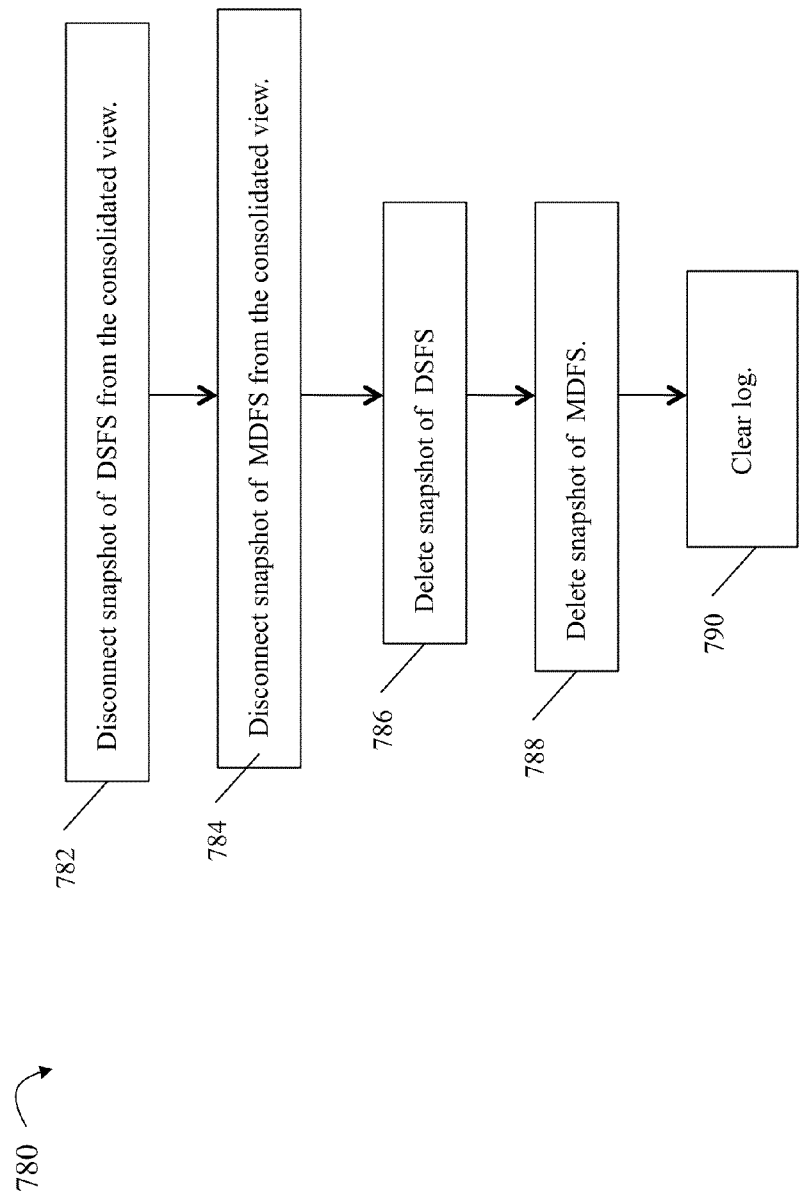

Referring to FIG. 10E, shown is a flowchart of processing steps that may be performed in an embodiment in accordance with techniques herein for deleting a snapshot of a file system. The flowchart 780 summarizes processing described above. At step 782, the snapshot of the DSFS is disconnected from the consolidated view. At step 784, the snapshot of the MDFS is disconnected from the consolidated view. At step 786, the snapshot of the DSFS is deleted. At step 788, the snapshot of the MDFS is deleted. At step 790, the log recording the deletion processing steps of flowchart 780 is cleared thereby indicating that the deletion processing for the file system has completed/is no longer in progress.

It should be noted that the flowchart 780 includes processing where the file system snapshot being deleted includes a single DSFS and single MDFS. As will be appreciated by those skilled in the art, if there are multiple DSFSs and/or MDFSs in the file system snapshot being deleted, then steps 782 and 784 may be generally performed with respect to each such DSFS and MDFS.

Aspects of the above-mentioned processing performed upon a failure during the atomic or transactional processing to create a snapshot of a file system may also apply with respect to a failure in the transactional processing to delete a snapshot of a file system. The MDFS including the snapshot of the file system's metadata may coordinate the deletion processing. If the coordinating MDFS fails, the coordinating MDFS may continue processing with the failed step denoted in the log file.

What will now be described is an additional example of a failure case applicable to both creating snapshot of a file or a file system. In some embodiments, a first component other than the MDFS hosting the file or file system being snapshot may orchestrate or control the snapshot processing steps as described herein. For example, a data storage administrator may control the snapshot processing from a management console. In this case, this first component may also become unavailable or otherwise not able to control the snapshot processing steps to completion. In this case, an embodiment may detect such a failure and choose to have a second component perform processing similar to that as described herein when the controlling MDFS reboots/restarts. That is, the second component may perform processing to ensure that any/all MDFSs and DSFSs affected by the failed snapshot operation have been thawed (e.g., any DSFS and MDFS that were previously frozen as indicated by the FS level log), cleanup and undo any steps of the snapshot operation in the log, and then restart the snapshot operation.

An embodiment in accordance with techniques herein may include multiple file systems, such as multiple DSFSs where each DSFS is configured using underlying storage from varying storage tiers. For example, an embodiment may include 3 storage tiers—a first highest performance tier of SSDs, a second medium performance tier including FC rotating disk drives and a third lowest performance tier including SATA rotating disk drives. A DSFS may have its data stored on underlying physical devices of a particular tier based on desired performed for the DSFS. A directory included in the client's logical representation (e.g., FIG. 5) may have an associated property or QOS parameter (e.g., included in associated metadata) where the QOS parameter has a value indicating whether files of the directory are created in a DSFS having its storage on the first SSD tier, second FC tier or third SATAs storage tier. In a similar manner, a file may have an associated property or QOS parameter having a value indicating a storage tier for the DSFS including the file's data. More generally, a value for a QOS parameter may be specified at a node at any level in the user's consolidated view whereby any file created beneath this node (e.g., as a descendant of the node) may have/inherit the QOS parameter value of the node thereby indicating which DSFS and underlying physical drives will host the file's data. To further illustrate, an embodiment may associate a QOS parameter with a directory (node) in the user's consolidated view. The QOS parameter may have one of three possible "color" values—GREEN, BLUE, RED. The QOS parameter value of GREEN denotes a FAST storage tier performance thereby indicating that files in the directory are created in a DSFS configured using SSDs. The QOS parameter may have a "color" value such as BLUE denoting MEDIUM storage tier performance thereby indicating that files in the directory are created in a DSFS configured using FC rotating disk drives. The QOS parameter may have a "color" value of RED denoting SLOW storage tier performance thereby indicating that files in the directory are created in a DSFS configured using SATA rotating disk drives. Thus, the QOS parameter encoding may be used to drive the selection of a DSFS for storing file data based on the underlying physical storage devices used for the DSFS.

Referring to FIG. 10D, shown is a flowchart of processing steps as may be performed in an embodiment in connection with techniques herein for creating a snapshot of a file system. The steps of 750 summarize processing described above. In this example, the file system includes a single MDFS and a single DSFS however steps of 750 may be suitably performed a different number of times for those file systems including a different number of MDFSs or DSFSs. At step 752, quiescing is performed with respect to the MDFS and the DSFS for the file system being snapshot. In step 754, a snapshot of the MDFS is created. In step 756, a snapshot the DSFS created. In step 758, unquiescing is performed with respect to the MDFS and DSFS for the file system being snapshot. In step 759, any post processing that may be included in an embodiment may be performed. As steps 752-759 are performed, information may be logged as described above. Once the snapshot processing steps have been successfully completed, the log for the snapshot processing of the file system may be cleared in step 760. In step 762, the snapshot of the file system may be included in the client's consolidated view.

It should be noted that the superblock of the different MDFSs and DSFSs that may be included in a file system (from the user's consolidated view) being snapshot may be used to store the log information for the per file system log (e.g. the processing steps as recorded in the file system log) in a manner similar to that as noted above in connection with creating a file snapshot.

Described herein are techniques related to a snapshot of a file system and also a snapshot of a file. An embodiment may include functionality for performing one or more operations described herein with respect to a file system independent of functionality for performing one or more operations described herein with respect to a file. For example, an embodiment may include functionality for creating a snapshot of a file system, alone or in addition to, functionality for creating a snapshot of a file. Similarly, an embodiment may include functionality for creating a snapshot of a file, alone or in addition to, functionality for creating a snapshot of a file.

In summary, the above-mentioned description sets forth techniques for creating a snapshot of a distributed file system or a file thereof. The distributed file system includes metadata file systems storing metadata about files in the distributed file system and includes data file systems storing file content data. The technique includes a quiescing phase which causes the suppression of the effective execution of requests affecting the state of the distributed file system, or file thereof, for which a snapshot is being created. Snapshots of both metadata and data are obtained. In the case of the distributed file system, the snapshot of metadata includes a snapshot of each metadata file system of the distributed file system. For the distributed file system, the snapshot of data includes a snapshot of each data file system of the distributed file system. In the case of a snapshot of a specific file, the metadata snapshot includes the metadata associated with the specific file, including attribute values and layout information, while the data snapshot includes snapshots taken on all of the data file systems which contain any portion of the data for the specified file. Finally, upon successful completion of obtaining snapshots of metadata and file data, an unquiescing phase is performed to allow resuming execution of requests affecting the state of the distributed file system, or the file thereof.

Figure 11:
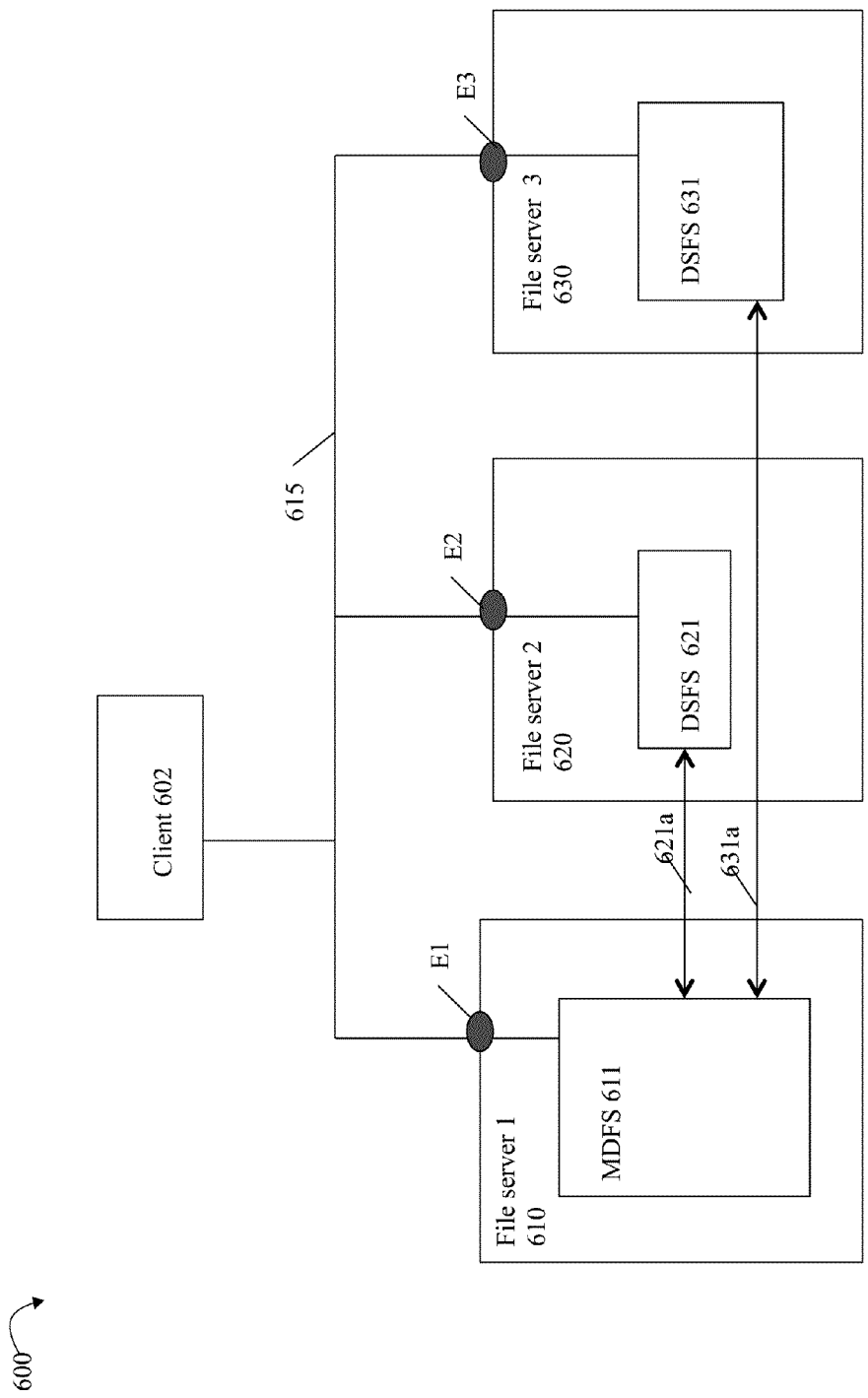
FIG. 11 is an example illustrating use of multiple entry or communication points in connection with receiving and processing client requests as may be performed in an embodiment in accordance with techniques herein.

Referring to FIG. 11, shown is an example of components that may be included in an embodiment in accordance with techniques herein. The example 600 includes a client 602 which may issue a client request over network connections 615 to any of the three entry or communication points E1, E2 or E3. E1, E2 and E3 are located, respectively, on file servers 610, 620 and 630. File server 610 includes MDFS 611. File server 620 includes DSFS 621. File server 630 includes DSFS 631. Each file server 610, 620 and 630 may include components such as illustrated in FIG. 3B. A client request for metadata directed to MDFS 611 may be sent to E1 whereby the request is received by 611. If the client request for metadata is sent to E2, the request may be forwarded 621a by DSFS 621 on the receiving server 620 to the MDFS 611. If the client request for metadata is sent to E3, the request may be forwarded 631a by DSFS 631 on the receiving server 630 to the MDFS 611. It should be noted that the forwarding illustrated by 631a may be direct from 630 to 610 or may pass through 620 depending on the connections between the servers 610, 620 and 630. In a similar manner, requests for file data received by MDFS 611 may also be forwarded to the appropriate DSFS 621 or 631. The foregoing may pertain to client requests for clients understanding metadata and file data and making specific requests for each as in accordance with the pNFS protocol.

As another example, consider a client request specifying an NFS protocol from a client that does not utilize some aspects of metadata such as layout information. The single client request to read file data may include the file server performing additional processing to obtain the appropriate file metadata, use such metadata layout information to obtain from the file data from the appropriate DSFS, and return the file data to the client. In this case, when such a client request is received and interpreted at any of the points E1-E3, the client request may be forwarded to MDFS 611 for processing and coordination of such processing. Alternatively, the particular server including the entry point at which the request is received may communicate with the MDFS and other DSFSs as needed to service the client request. For example, the single client request for reading file data may be received at E2. DSFS 621 may communicate with MDFS 611 to obtain the metadata including layout information and then either obtain the appropriate file data from DSFS 621 or may obtain the appropriate file data from DSFS 631. It should be noted that although the various DSFSs and MDFSs are described as performing the forwarding, coordinating and communicating in connection with client request processing, such steps may also be performed by other software on each of the servers 610, 620 and 630.

An embodiment may implement the techniques herein using code executed by a processor. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of creating a snapshot of a distributed file system comprising:
   quiescing requests affecting the distributed file system, the distributed file system including a first set of one or more metadata file systems storing metadata about files in the distributed file system and including a second set of one or more data file systems storing file content data for files of the distributed file system;
   obtaining a snapshot of each metadata file system in the first set;
   obtaining a snapshot of each data file system in the second set;

determining whether there has been successful completion of said obtaining said snapshot for each metadata file system in the first set and successful completion of said obtaining said snapshot of each data file system in the second set;

responsive to successful completion of said obtaining said snapshot for each metadata file system in the first set and successful completion of said obtaining said snapshot of each data file system in the second set, unquiescing requests affecting the distributed file system whereby the snapshot of the distributed file system is created as a result of successfully completing said first obtaining step and said second obtaining step and wherein the snapshot of the distributed file system includes the snapshot of each metadata file system in the first set and includes the snapshot of each data file system in the second set;

determining whether there has been a failure of any of said first obtaining step and said second obtaining step; and responsive to determining failure of any of said first obtaining step and said second obtaining step, performing processing that includes deleting any snapshot of a metadata file system created during the first obtaining step prior to the failure and deleting any snapshot of a data file system created during the second obtaining step prior to the failure.

2. The method of claim 1, further comprising recording information about processing steps performed in connection with creating the snapshot of the distributed file system and wherein, upon failure of a first of the processing steps performed in connection with creating the snapshot of the distributed file system as recorded, using said information recorded in connection with recovering from the failure of the first processing step to undo one or more processing steps in connection with creating the snapshot of the distributed file system previously performed prior to the failure of the first processing step.

3. The method of claim 1, wherein said quiescing includes temporarily suspending commencement of at least a portion of new requests affecting the distributed file system, completing pending requests, flushing any cached file content data and metadata of the distributed file system.

4. The method of claim 3, wherein said quiescing selectively suspends modifying operations and allows non-modifying operations with respect to the distributed file system having a snapshot created.

5. The method of claim 1, wherein obtaining a snapshot of each metadata file system in the first set includes creating a new metadata file system including, for each file in the distributed file system, a snapshot of metadata for said each file and wherein obtaining a snapshot of each data file system in the second set includes creating a new data file system including, for each file in the distributed file system, a snapshot of file content data for said each file.

6. The method of claim 1, wherein a consolidated logical view of a plurality of distributed file systems is presented to a client, the consolidated logical view including a root having a first subdirectory corresponding to the snapshot of the distributed file system and a second subdirectory corresponding to the distributed file system.

7. The method of claim 1, wherein processing is performed to transactionally delete the snapshot of the distributed file system.

8. A computer readable medium comprising code stored thereon that, when executed, performs a method for creating a snapshot of a file included in a distributed file system comprising:

quiescing requests affecting the file of the distributed file system, wherein the distributed file system includes a first set of one or more metadata file systems storing metadata about files in the distributed file system and includes a second set of one or more data file systems storing file content data for files of the distributed file system, said file having its metadata stored in one or more metadata file systems of the first set and having its file content data stored in one or more data file systems of the second set;

obtaining a snapshot of the metadata for the file;

obtaining a snapshot of the file content data for the file;

assigning the snapshot of metadata for the file to point to the snapshot of file content data for the file;

unquiescing requests affecting the file upon successfully completing processing to create the snapshot of the file;

determining whether there has been a failure of any of said obtaining said snapshot of the metadata for the file and said obtaining said snapshot of the file content data for the file; and responsive to determining failure of any of said obtaining said snapshot of the metadata for the file and said obtaining said snapshot of the file content data for the file, performing processing that includes deleting any of said snapshot of the metadata for the file created during said first obtaining step prior to the failure and said snapshot of the file content data for the file created during the second obtaining step prior to the failure.

9. The computer readable medium of claim 8, wherein the second set includes a plurality of data file systems and the file content for the file is stored in a plurality of the data file systems.

10. The computer readable medium of claim 8, further including code to transactionally delete the snapshot of the file.

11. The computer readable medium of claim 8, wherein said quiescing includes temporarily suspending commencement of at least a portion of new requests affecting the file, completing pending requests for the file, and flushing any cached file content data and metadata of the file.

12. The computer readable medium of claim 11, wherein said quiescing selectively suspends modifying operations and allows non-modifying operations with respect to the file for which a snapshot is being created.

13. A system for creating a snapshot of a distributed file system comprising:

a computer readable medium comprising code stored thereon that, when executed, performs a method comprising:

quiescing requests affecting the distributed file system, the distributed file system including a first set of one or more metadata file systems storing metadata about files in the distributed file system and including a second set of one or more data file systems storing file content data for files of the distributed file system;

obtaining a snapshot of each metadata file system in the first set;

obtaining a snapshot of each data file system in the second set; and determining whether there has been successful completion of said obtaining said snapshot for each metadata file system in the first set and successful completion of said obtaining said snapshot of each data file system in the second set;

responsive to successful completion of said obtaining said snapshot for each metadata file system in the first set and successful completion of said obtaining said snapshot of each data file system in the second set, unquiescing requests affecting the distributed file system whereby the snapshot of the distributed file system is created as a result of successfully completing said first obtaining step and said second obtaining step and wherein the snapshot of the distributed file system includes the snapshot of each metadata file system in the first set and includes the snapshot of each data file system in the second set;

determining whether there has been a failure of any of said first obtaining step and said second obtaining step; and responsive to determining failure of any of said first obtaining step and said second obtaining step, performing processing that includes deleting any snapshot of a metadata file system created during the first obtaining step prior to the failure and deleting any snapshot of a data file system created during the second obtaining step prior to the failure; and one or more server systems, wherein code for each of the one or more metadata file systems and each of the one or more data file systems is stored in a memory of any of the one or more server systems.

14. The system of claim 13, wherein the system includes a plurality of server systems and the second set includes a plurality of data file systems, each of the plurality of data file systems being included in a different one of the plurality of server systems, and wherein file content data for at least a first file of the distributed file system is stored in more than one of the plurality of data file systems.

15. The system of claim 14, wherein a client request for metadata about a file in the file system is received at a first of the plurality of server systems, wherein said first server system includes one of the plurality of data file systems, said client request being forwarded for processing to a metadata file system of the first set included in a different one of the plurality of server systems.

* * * * *